(12) United States Patent
Hartung et al.

(10) Patent No.: US 10,351,192 B2
(45) Date of Patent: Jul. 16, 2019

(54) ADJUSTABLE COMPLIANCE BICYCLE

(71) Applicant: Trek Bicycle Corporation, Waterloo, WI (US)

(72) Inventors: Tim Hartung, Cottage Grove, WI (US); Steven Moechnig, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 16/145,626

(22) Filed: Sep. 28, 2018

(65) Prior Publication Data

US 2019/0031273 A1   Jan. 31, 2019

Related U.S. Application Data

(62) Division of application No. 15/156,495, filed on May 17, 2016, now Pat. No. 10,086,899.

(60) Provisional application No. 62/163,076, filed on May 18, 2015, provisional application No. 62/162,812, filed on May 17, 2015.

(51) Int. Cl.

| | | |
|---|---|---|
| *B62J 1/02* | (2006.01) | |
| *B62K 19/16* | (2006.01) | |
| *B62J 1/08* | (2006.01) | |
| *B62K 19/18* | (2006.01) | |
| *B62K 21/06* | (2006.01) | |
| *B62K 3/04* | (2006.01) | |
| *B62K 19/04* | (2006.01) | |
| *B62K 19/36* | (2006.01) | |

(52) U.S. Cl.
CPC . *B62J 1/02* (2013.01); *B62J 1/08* (2013.01); *B62K 3/04* (2013.01); *B62K 19/04* (2013.01); *B62K 19/16* (2013.01); *B62K 19/18* (2013.01); *B62K 19/36* (2013.01); *B62K 21/06* (2013.01); *B62K 2700/32* (2013.01)

(58) Field of Classification Search
CPC ............. B62J 1/02; B62K 19/16; B62K 19/18
See application file for complete search history.

(56) References Cited

U.S. PATENT DOCUMENTS

| 673,661 | A | * | 5/1901 | Reid | ...................... | A63G 19/00 |
| | | | | | | 280/227 |
| 5,725,225 | A | * | 3/1998 | Lai | ........................ | B62K 19/00 |
| | | | | | | 280/275 |

(Continued)

FOREIGN PATENT DOCUMENTS

| EP | 0586754 A1 * | 3/1994 | ............. B62K 19/36 |
| FR | 2704826 A1 * | 11/1994 | ................ B62J 1/06 |

*Primary Examiner* — Kevin Hurley
(74) *Attorney, Agent, or Firm* — Bell & Manning, LLC

(57) ABSTRACT

A bicycle including a forward frame triangle. The forward frame triangle can a top tube, a down tube, a bottom bracket, a lower seat mast, and an upper seat mast. The top tube can have a first end connected to a head tube and a second end. The down tube can have a first end connected to the head tube and a second end. The bottom bracket can be connected to the second end of the down tube. The lower seat mast can extend in an upward direction from the bottom bracket to the top tube. The upper seat mast can at least partially overlap the lower seat mast. The upper seat mast can be adjustably and fixedly coupled to the lower seat mast. The upper seat mast can be rotably coupled to the forward frame triangle proximate the second end of the top tube.

10 Claims, 23 Drawing Sheets

(56) References Cited

U.S. PATENT DOCUMENTS

| | | | |
|---|---|---|---|
| 6,837,506 B2* | 1/2005 | Amos | B62K 3/10 |
| | | | 280/275 |
| 8,807,585 B2* | 8/2014 | Alan | B62J 1/08 |
| | | | 280/274 |
| 9,604,690 B2* | 3/2017 | Huber | B62K 19/36 |
| 10,150,530 B2* | 12/2018 | Lund | B62K 19/36 |
| 2003/0227156 A1* | 12/2003 | Morita | B62K 3/10 |
| | | | 280/283 |
| 2012/0169028 A1* | 7/2012 | Lund | B62K 19/18 |
| | | | 280/281.1 |

* cited by examiner

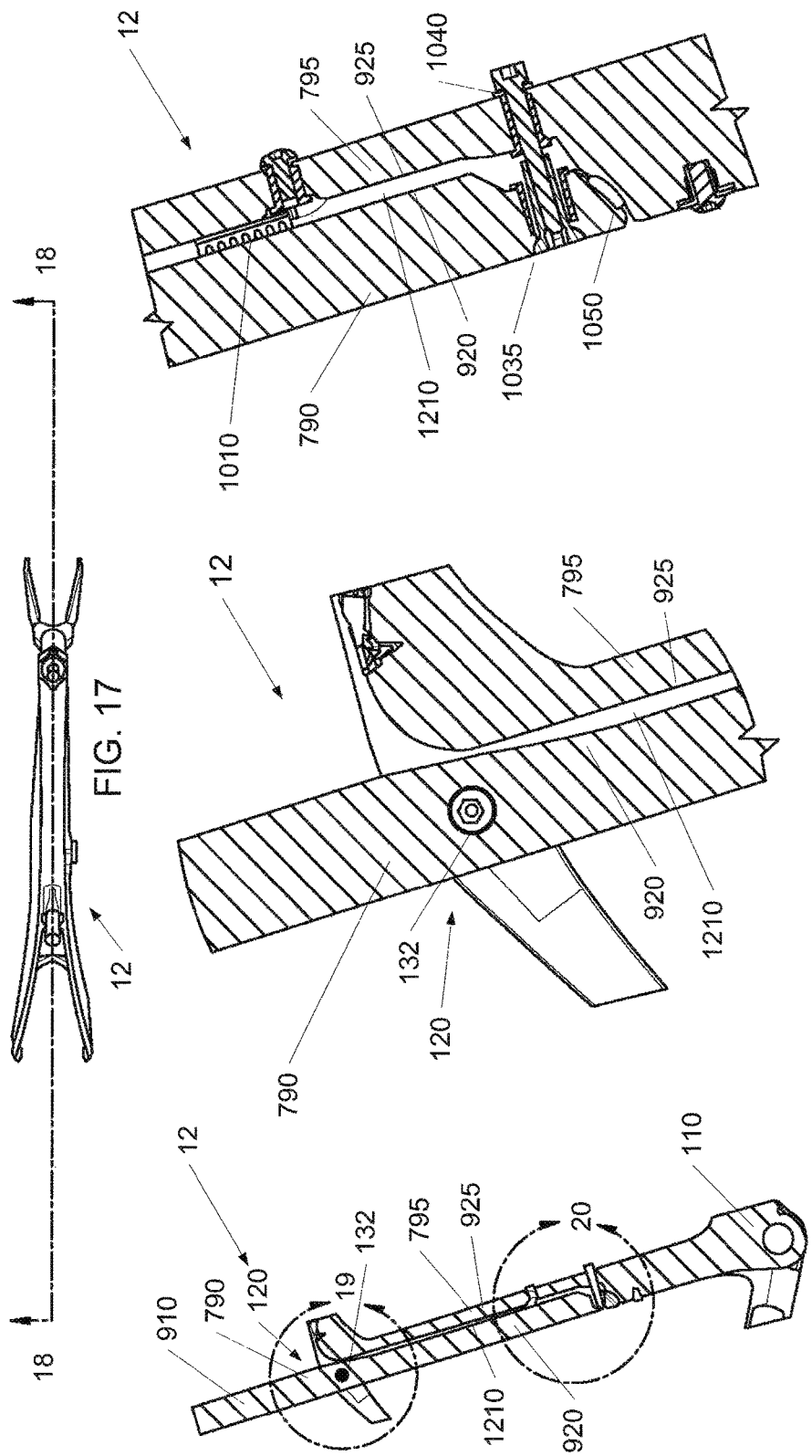

ADJUSTABLE COMPLIANCE BICYCLE

CROSS-REFERENCE TO RELATED PATENT APPLICATIONS

The present application is a divisional of U.S. patent application Ser. No. 15/156,495 that was filed May 17, 2016, the entire contents of which are hereby incorporated by reference; which claims priority to U.S. Provisional Application No. 62/162,812 that was filed May 17, 2015 and U.S. Provisional Application No. 62/163,076 that was filed May 18, 2015, the entire contents of which are incorporated by reference herein.

BACKGROUND

The present invention relates to bicycles and, more particularly, to bicycle frames with adjustable compliance. Riders may desire different levels of compliance in their bicycles. Further, riders may desire to alter compliance in their bicycles based on riding conditions. Therefore, new and improved ways to modify and control compliance in bicycle frames are needed.

SUMMARY

The present disclosure provides a bicycle frame assembly having an adjustable, deflectable seat tube that overcomes one or more of the aforementioned drawbacks. One aspect of the invention discloses a bicycle frame assembly having an upper frame member and a lower frame member. The upper frame member includes a top tube and a pair of seat stays and extends between a dropout and a head tube in a generally continuous manner. The lower frame member includes a bottom tube, a bottom bracket, and a chain stay and extends between the dropout and the head tube. A seat tube can extend from the lower frame member toward the upper frame member and passes beyond the top tube. The seat tube can be connected at least in part to the upper frame member by a pivot so that more of the seat tube is located between the pivot and the bottom bracket than extends beyond the upper frame member. In one embodiment, an opening is formed through the top tube or a lug that connects the seat stays with the top tube. The seat tube can pass through the opening in the upper frame member. Alternatively, the seat tube could be perforated or otherwise contoured to pass generally around the more horizontal structure of the top tube and/or the seat stays. As another alternative, the seat tube could pass rearward relative to the top tube so as to be positioned in the space generally flanked by the seat stays. As another alternative, a portion of the seat tube can also be connected statically to the top tube and/or the pair of seat stays. As another alternative, the seat tube can be adjusted by an adjustment feature such as a stiffener. As another alternative, the seat tube can be made of two portions that can be coupled in various configurations by the user.

Another aspect of the disclosure that is useable with one or more of the above aspects discloses a bicycle frame assembly that includes a forward frame triangle that includes a top tube and a bottom tube. The top tube includes a first end that is connected to a head tube and a second end. The bottom tube includes a first end that is connected to the head tube and a second end. A bottom bracket is connected to the second end of the bottom tube. An adjustable seat tube extends in an upward direction from the bottom bracket and a pair of seat stays can be connected to the top tube and extend in a rearward direction beyond the forward frame triangle. A pivot can connect the adjustable seat tube to the forward frame triangle proximate the top tube at a location nearer a bicycle seat than the bottom bracket. The pivot allows that portion of the seat tube disposed between the pivot and the bottom bracket to adjustably deflect from an at rest position during vertical loading of the seat tube. Alternatively, a portion of the seat tube can also be connected statically to the top tube and/or the pair of seat stays. As another alternative, the seat tube can be adjusted by an adjustment feature such as a stiffener. As another alternative, the seat tube can be made of two portions that can be coupled in various configurations by the user.

Another aspect of the disclosure that is useable with one or more of the above aspects discloses a bicycle frame assembly having an upper frame member that includes a top tube and a pair of seat stays. The upper frame member extends between a dropout associated with a rear wheel and a head tube. An opening can be formed in the upper frame member. A lower frame member that includes a bottom tube, a bottom bracket, and a chain stay extends between the dropout and the head tube. An adjustable seat tube can extend from the lower frame member toward the upper frame member and passes through the opening in the upper frame member. A pivot can connect the seat tube to the upper frame member proximate the opening so that more of the seat tube is located between the pivot and the bottom bracket than extends beyond the upper frame member. Alternatively, a portion of the seat tube can also be connected statically to the top tube and/or the pair of seat stays. As another alternative, the seat tube can he adjusted by an adjustment feature such as a stiffener. As another alternative, the seat tube can be made of two portions that can be coupled in various configurations by the user.

Another aspect of the disclosure that is useable with one or more of the above aspects discloses a method of allowing adjustable deflection of a seat tube. An adjustable seat tube is connected to a bottom bracket. The seat tube can be connected to an upper frame member with a pivot that is located at an overlapping intersection of the seat tube and the upper frame member so that the seat tube can deflect from alignment along a line between the bottom bracket and the pivot. Alternatively, a portion of the seat tube can also be connected statically to the top tube and/or the pair of seat stays. As another alternative, the seat tube can be adjusted by an adjustment feature such as a stiffener. As another alternative, the seat tube can be made of two portions that can be coupled in various configurations by the user.

These and various other features and advantages of the present disclosure will be made apparent from the following detailed description and the drawings.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 17 is a top sectioning view of the frame assembly 12 of FIG. 7 in accordance with an illustrative embodiment.

FIG. 18 is a side section view of Section 18-18 of the adjustable seat tube 22 area of the frame assembly 12 of FIG. 7 in accordance with an illustrative embodiment.

FIG. 19 is a side section view of Detail 19 of the frame assembly 12 of FIG. 7 in accordance with an illustrative embodiment.

FIG. 20 is a side section view of Detail 20 of the frame assembly 12 of FIG. 7 in accordance with an illustrative embodiment.

DETAILED DESCRIPTION OF THE ILLUSTRATIVE EMBODIMENTS

Figure 1:
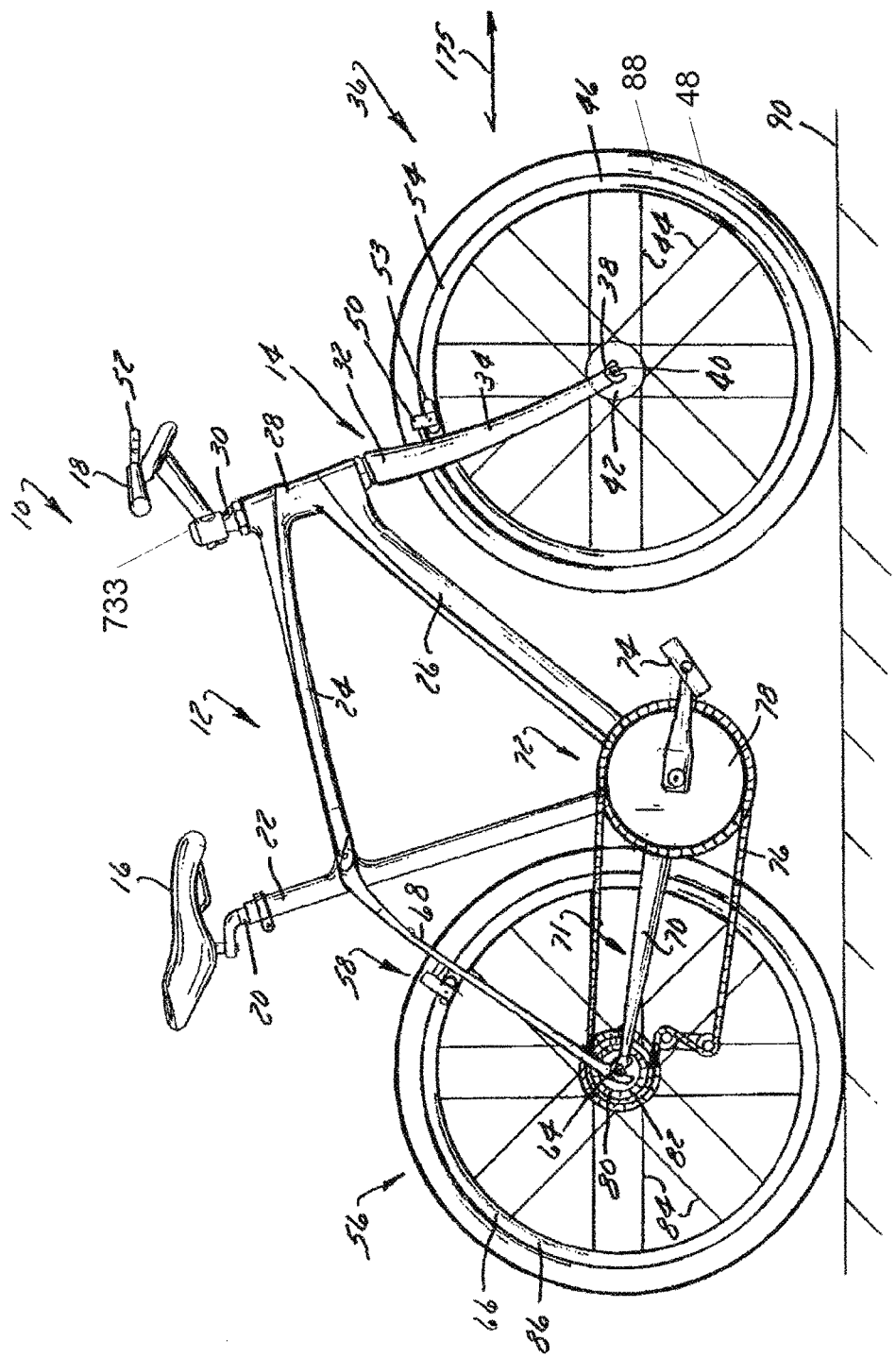
FIG. 1 is a side elevation view of a bicycle having a bicycle frame assembly in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 shows a bicycle 10 having a frame assembly 12 according to the present invention. Bicycle 10 includes a seat 16 and handlebars 18 that are attached to frame assembly 12. A seat post 20 is connected to seat 16 and slidably engages an adjustable seat tube 22 of frame assembly 12. A top tube 24 and a down tube (bottom tube) 26 extend forwardly from adjustable seat tube 22 to a head tube 28 of frame 712. Handlebars 18 are connected to a stern or steer tube 30 that passes through head tube 28 and is connected or integrally formed with a fork crown 32. Handlebar 18 may include a stern that is constructed to slidably engage an interior cavity of steer tube 30. It is appreciated that one or more of the structures of bicycle 10 and frame assembly 12 can be constructed from similar materials, a variety of different materials, and various combinations thereof, such as steel, titanium, aluminum, and fiber reinforced plastic. Frame assembly 12 and adjustable seat tube 22 can be formed of metal-type materials, such as aluminum-type materials, carbon fiber materials, and/or materials that are sufficiently formable and robust enough to support the rider of bicycle 10.

Fork assembly 14 includes a pair of fork blades or fork legs 34 that extend from generally opposite ends of fork crown 32 and are constructed to support a front wheel assembly 36 at an end thereof or dropout 38. Dropouts 38 engage generally opposite sides of an axle 40 constructed to engage a hub 42 of front wheel assembly 36. A number of spokes 44 extend from hub 42 to a rim 46 of front wheel assembly 36. A tire 48 is engaged with rim 46 such that rotation of hub 42 and rim 46, relative to fork legs 34, rotates tire 48. Fork assembly 14 can be secured to the head tube 28 by steer cap 733.

Bicycle 10 includes a front brake assembly 50 having an actuator 52 attached to handlebars 18 and a pair of brake pads 53 positioned on generally opposite sides of front wheel assembly 36. Brake pads 53 can be constructed to engage a brake wall 54 of rim 46 thereby providing a stopping or slowing force to front wheel assembly 36. A rear wheel assembly 56 includes a brake assembly 58 similar to front wheel brake assembly 50 but it is appreciated that one or both of front and rear wheel brake assemblies 50, 58 could be provided in other brake configurations such as a disk brake assembly wherein a rotor and a caliper are positioned proximate one or more of front wheel axle 40 or a rear axle 64, respectively. A rear wheel 66 is positioned generally concentrically about rear axle 64.

A pair of seat stays 62, 68 (FIG. 2) and a pair of chain stays 70, 71 (FIG. 2) extend rearward relative to adjustable seat tube 22 and offset rear axle 64 from a crankset 72. Crankset 72 includes a set of pedals 74 that is operationally connected to a flexible drive member such as a chain 76 via one or more variable diameter chain gears or a chain ring or sprocket 78. Rotation of chain 76 communicates a drive force to a gear cluster 80 positioned proximate rear axle 64. Gear cluster 80 is generally concentrically orientated with respect to rear axle 64 and includes a number of variable diameter gears.

Gear cluster 80 is operationally connected to a hub 82 of rear wheel 66. A number of spokes 84 extend radially between hub 82 and a rim 86 of rear wheel 66 of rear wheel assembly 56. As is commonly understood, rider operation of pedals 74 drives chain 76 thereby driving rear wheel 66 which in turn propels bicycle 10. Fork assembly 14 is constructed to support a forward end 88 of bicycle 10 above a ground surface 90. Handlebar 18 is connected to frame 712 and fork assembly 14 such that operator manipulation of handlebar 18 is communicated to fork assembly 14 to facilitate rotation of front wheel assembly 36 relative to frame assembly 12 along a longitudinal axis, indicated by arrow 175, of bicycle 10. A longitudinal plane in the direction of arrow 175 can divide the bicycle 10 into a right-side and a left side from the perspective of a rider sitting on saddle 16 and facing forward end 88. As is commonly understood, such manipulation of handlebar 18 steers bicycle 10 during riding.

The construction of bicycle 10 shown in FIG. 1 is merely exemplary of a number of bicycle configurations. That is, whereas bicycle 10 is shown as what is commonly understood as a street or road bike, it is appreciated that the present invention is applicable to a number of bicycle configurations including those bicycles with more aggressive suspension systems commonly found in off-road or mountain bike frame configurations, and/or hybrids, crossover or multi-purpose bicycle frame configurations.

Figure 2:
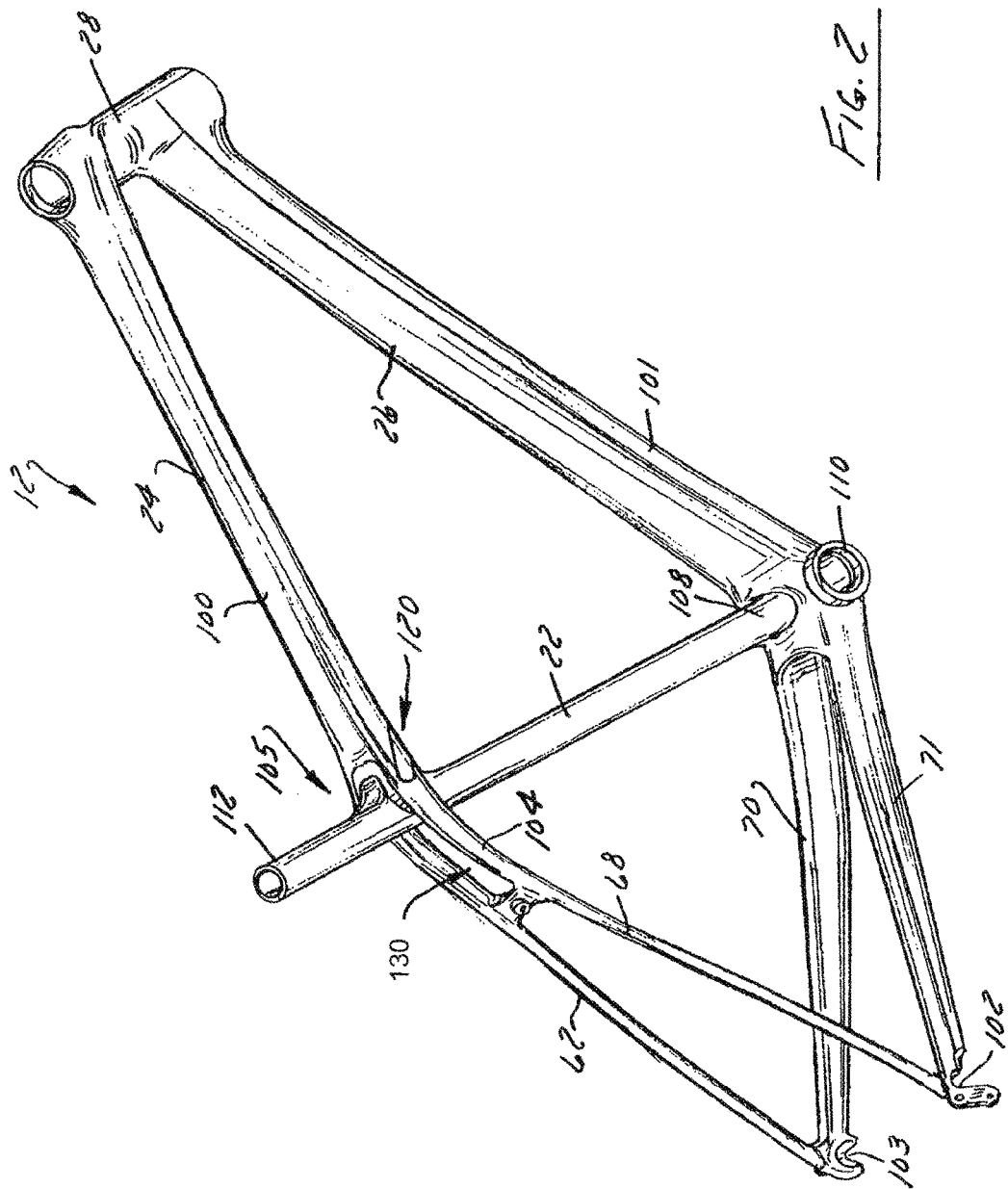
FIG. 2 is an elevated right hand perspective view of bicycle frame assembly shown in FIG. 1 with the wheels, seat, drive and handlebar assemblies removed therefrom.

Referring to FIGS. 1 and 2, top tube 24 and seat stays 68 extend in a fairly continuous manner to form an upper frame member 100 that extends from head tube 28 to a pair of dropouts 102, 103 that support rear axle 64. Upper frame member 100 can be formed as one piece and/or assembled from a distinct top tube 24, seat stays 68, and/or an optional lug 104 that is disposed between the top tube 24 and the seat stays 68. It is appreciated that seat stays 62, 68 and top tube 24 of upper frame member 100 could be formed as a unitary structure, a number of discrete permanently connected elements, or connected to one another via an optional lug 104 associated with an overlap area 105 of adjustable seat tube 22 and upper frame member 100. In a similar manner, it is also appreciated that down tube 26, bottom bracket 110, and chain stays 70, 71, whose assemblies collectively define a lower frame member that extends from head tube 28 to one or more dropouts 102, 103 could be formed as a unitary assembly wherein bottom bracket 110 is formed with down tube 26 or chain stays 70, 71, or an assembly wherein the chain stays 70, 71 and down tube 26 can be permanently affixed to a discrete bottom bracket lug or simply bottom bracket 110. Once assembled, as plainly shown in FIG. 1, bicycle 10 includes a forward frame triangle that is a generally defined by the triangular shape of the direction of extension of the seat tube, the top tube, and the down tube of frame assembly 12 regardless of the methodology or number of discrete elements used to form the frame assembly.

As shown in FIG. 2, in one illustrative embodiment, adjustable seat tube 22 includes a first end 108 that is secured to bottom bracket 110 of bicycle frame 712 and a second end 112 that extends in a generally upward direction beyond the location of the lug or overlap area 105 with upper frame member 100. Seat post 20 (FIG. 1) can telescopically cooperate with adjustable seat tube 22 of frame assembly 12. A passive pivot assembly 120 can connect an upper portion of adjustable seat tube 22 to bicycle frame assembly 12 proximate overlap area 105 such that more of adjustable seat tube 22 extends between pivot assembly 120 and bottom bracket 110 than extends in an upward direction relative to the intersection of adjustable seat tube 22 and upper frame member 100.

Passive pivot assembly 120 can complete the linkage between upper frame member 100, which can include top tube 24 and the structures associated with seat stays 62, 68. A lower end of adjustable seat tube 22 can be secured to lower frame member IO 1, which can include the down tube 26 and bottom bracket 110 and one of more chain stays 70, 71. As explained above, adjustable seat tube 22, top tube 24 and down tube 25 collectively generally define the forward triangle of frame assembly 12. Frame assembly 12 has a fairly robust and stable feel during use but is also constructed to provide impact dampening performance in a manner that does not allow changing of the relative connection points of any of the respective members of the forward frame triangle. As described further below with respect to FIG. 6, the non-bonded rigid yet pivotable connection of seat tube 22 with upper frame member 100 allows deflection of adjustable seat tube 22 in a vertical plane and in a direction along the longitudinal length of the adjustable seat tube 22 so as to allow the frame assembly 12 to provide a limited degree of suspension performance or vertical compliance without altering the orientation of the connection points of any of the frame members relative to one another. In other words, as the rider encounters rough ground surface, the adjustable seat tube 22 can bend, absorbing the bumps thereby providing a more comfortable ride. The adjustable seat tube 22 seat tube can be adjusted by an adjustment feature such as a stiffener. For example, a plate can be secured to the seat tube 22 in an adjustable manner. In another example, the plate can be exchanged for a plate with a different stiffness. In another example, a top of a unitary seat tube can be coupled to the bottom of the seat tube by a turnbuckle. In another example, a preloading (i.e., the pressure on the bearing assemblies, for example, applied by the torquing of the pivot fasteners) of the passive pivot assembly 120 can be increased to decrease compliance of the seat tube 22; and the preloading of the passive pivot assembly 120 can be decreased to increase compliance of the seat tube 22. In another embodiment, a portion of the seat tube can also be connected statically to the top tube and/or the pair of seat stays. In another embodiment, the seat tube can be made of two portions that can be coupled in various configurations by the user.

Figure 3:
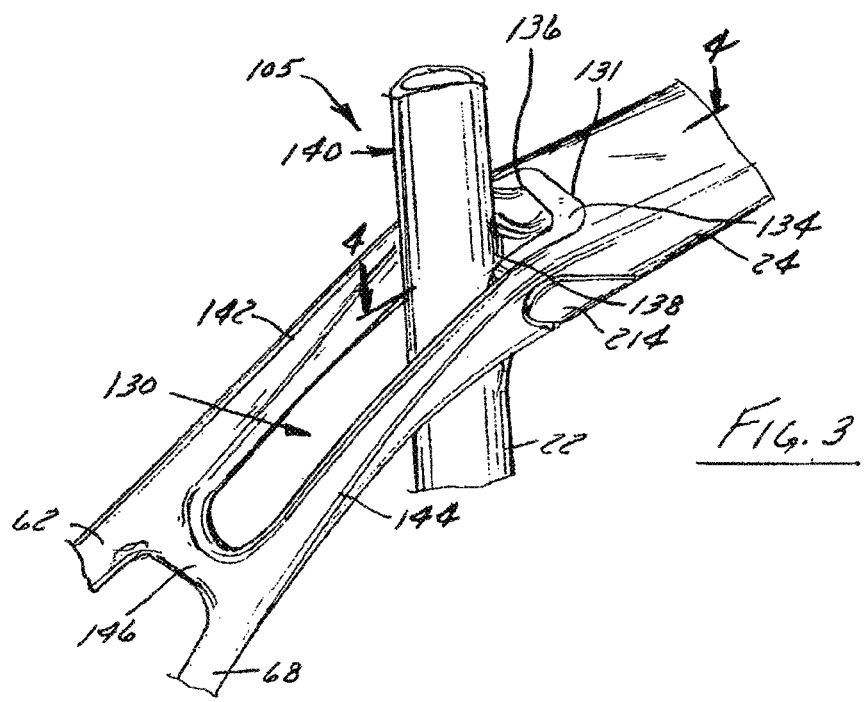
FIG. 3 is a view similar to FIG. 2 of an intersection of the seat tube with the upper frame member of the bicycle frame assembly shown in FIG. 1.
Figure 4:
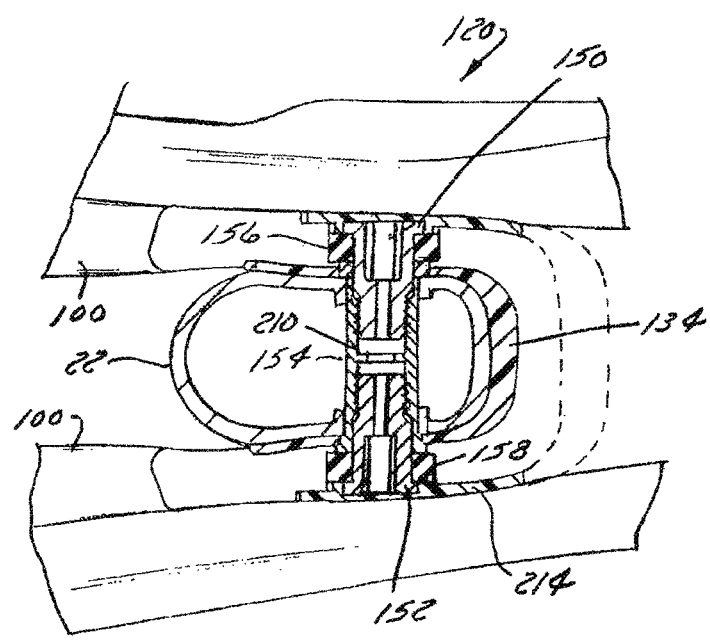
FIG. 4 is a cross-section of the intersection of the seat tube with the upper frame member taken along line 4-4 shown in FIG. 3.
Figure 5:
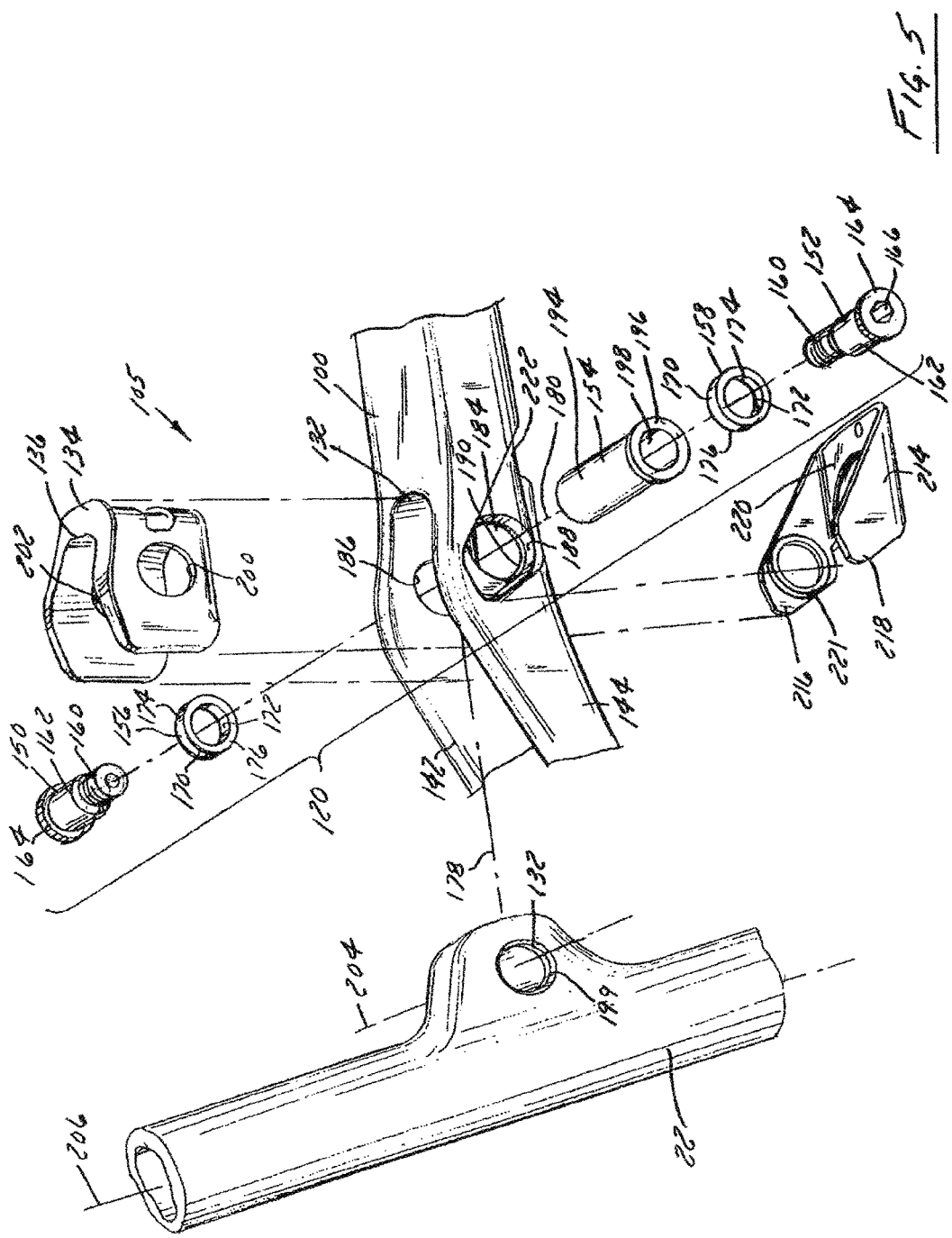
FIG. 5 is an exploded view of the assembly associated with the intersection of the seat tube and the upper frame member shown in FIG. 3.

As shown in FIGS. 3-5, overlap area 105 can include a passage 130 that is shaped to allow adjustable seat tube 22 to pass therethrough. An opening 132 (FIG. 5) is formed laterally through adjustable seat tube 22 and shaped to rotationally cooperate with pivot assembly 120. As mentioned above, it is envisioned that adjustable seat tube 22 can merely pass over an axis or longitudinal area associated with one or more of the top tube, the seat stays, and/or a fabrication lug being formed therebetween. It is envisioned that the seat tube could be perforated or otherwise contoured to pass generally around the more horizontal structure of the top tube and/or the seat stays associated with upper frame member 100. As another alternative, the seat tube could pass rearward relative to the closed structure of top tube 24 so as to be positioned in the space generally flanked by the seat stays. Each configuration allows limited passive pivoting between seat stays 70, 71 and the adjacent structure of upper frame member 100 of bicycle frame assembly 12.

As shown in FIG. 3, passage 130 can be bounded on a forward side 131 by an end wall associated with top tube 24 or a portion of the respective frame lug 104. A first optional gasket 134 is disposed between forward side 131 of overlap area 105 and top tube 24 and generally surrounds a forward side 136, and opposite lateral sides 138, 140 of adjustable seat tube 22. Optional gasket 134 prevents moisture and/or dirt and/or debris from entering the pivot area associated with passage 130 and the passage of adjustable seat tube 22 therethrough but does not otherwise interfere with the flexion of adjustable seat tube 22 during use of bicycle 10 as described further below with respect to FIG. 6. Passage 130 can be bounded on opposite lateral sides by side walls 142, 144 of upper frame member 100. An optional rear web wall 146 can complete the definition of passage 130 such that upper frame member 100 completely surrounds adjustable seat tube 22 with web wall 146 extending laterally between seat stays 62, 68.

As shown in FIGS. 4 and 5, pivot assembly 120 can include a first bolt or other fastener 150, a second bolt or other fastener 152, a guide sleeve 154, and first and second bearings or bushings 156, 158. Each of fasteners 150, 152 can include a threaded portion 160, a stem portion 162, and a head portion 164. The radial diameter of each fastener 150, 152 can gradually increase from the respective threaded portion 160 to the stem portion 162 to the head portion 164. One or each of head portions 164 can include a drive surface 166 that is shaped to cooperate with a driving tool, such as a hex driver or the like for securing each of first and second fasteners 150, 152 relative to pivot assembly 120. Although shown as being formed on an interior radial surface of fasteners 150, 152, it is appreciated that driving surface 166 could have any number of shapes and/or be provided on a radial exterior surface of the corresponding fastener 150, 152. It is further appreciated that one of fasteners 150, 152 could formed integrally with sleeve 154 such that operation of one respective fastener secures pivot assembly 120 relative to bicycle frame assembly 12.

Each bushing 156, 158 can include an outer radial surface 170, an inner radial surface 172, an outboard lateral surface 174, and an inboard lateral surface 176. As used herein, the inboard and outboard lateral directions associated with surfaces 174, 176 of each bushing 156, 158 refers to the orientation of surfaces 170, 174 relative to a longitudinal vertical plane that contains longitudinal axis 175 of bicycle 10 and the relative position of the respective surfaces and/or structures relative to the same. For example, surfaces 176 of bushings 156, 158 are nearer a longitudinal axis, indicated by line 178, of upper frame member 100. Accordingly, surfaces 174 are further outboard and surfaces 176 are further inboard relative to one another and longitudinal axis 178 of upper frame member 100 along a longitudinal axis, indicated by line 180, of pivot assembly 120. As shown in FIG. 5, the longitudinal axis 180 of pivot assembly 120 is oriented in a crossing direction relative to, and is normal to, longitudinal axis 178 of upper frame member 100.

Still referring to FIGS. 4 and 5, a first opening 184 and the second opening 186 can be formed in each of the respective sidewalls 142, 144 of upper frame member 100 and centered along axis 180 of pivot assembly 120. A seat 188 can extend circumferentially about at least one of openings 184, 186 in the lateral outboard facing surface of the respective sidewall 42, 144. Seat 188 can be defined by a lip 190 that extends circumferentially about the corresponding opening 184, 186 and can be shaped to cooperate with sleeve 154 and a corresponding bushing 156, 158.

Sleeve 154 can include a stem portion 194, the head portion 196, and an opening 198 formed therethrough. Sleeve 154 can be constructed to slidably cooperate with openings 184, 186 in a direction aligned with axis 180. When assembled, head portion 196 of sleeve 154 traverses an overlapping area between opening 184 and a seat 199 associated with opening 132 of adjustable seat tube 22 as well as opening 200 associated with optional gasket 134. Optional gasket 134 can include a second opening 202 that, when assembled, is also concentrically oriented with respect axis 180 of pivot assembly 120 and cooperates with the other of fasteners 150, 152. Opening 132 of adjustable seat tube 22 circumferentially cooperates with stem portion 194 of sleeve 154 when the longitudinal axis of opening 132 is aligned axis 180 of pivot assembly 120. As explained further below with respect to FIG. 6, the axis of opening 132 of adjustable seat tube 22 can be formed along a plane, indicated by line 204 that can be offset in a forward direction relative to longitudinal axis 175 of bicycle 10 and with respect to a longitudinal axis 206 of adjustable seat tube 22.

Threaded portions 160 of each fastener 150, 152 can operatively cooperate with a threaded surface 210 (FIG. 4) formed on an inner radial surface of sleeve 154. Bushings 156, 158 can rotatably cooperate with stem portion 162 of each of fasteners 150, 152 and cooperate with seats 188 defined by upper frame member 100. As shown in FIGS. 4 and 5, pivot assembly 120 can include another optional gasket 214 that cooperates with the laterally outboard directed sides of pivot assembly 120. Gasket 214 can includes a first arm 216 and a second arm 218 that extend in a generally upward direction relative to a web wall 220. The laterally inboard facing side of each arm 216, 218 can include a lip 221 that is shaped to snuggly cooperate with a radially outboard directed surface of head portion 164 of a respective fastener 150, 152. The upper frame member 100 can include a recess 222 that is shaped to mimic the shape of gasket 214 such that when assembled, gasket 214 provides a generally smooth contour along the exterior surface of upper frame member 100 associated with pivot assembly 120.

When assembled, pivot assembly 120 can provide a secure connection between upper frame member 100 and adjustable seat tube 22 and does so in a manner that prevents lateral, longitudinal, and vertical movement of adjustable seat tube 22 relative to upper frame member 100 but allows rotation of adjustable seat tube 22 about axis 180 associated with opening 132 which is collinear with pivot assembly 120 relative to upper frame member 100. Such a connection allows only flexion or flexing movement of seat tube 22 relative to the other structural members of bicycle frame assembly 12 during use of bicycle 10.

Figure 6:
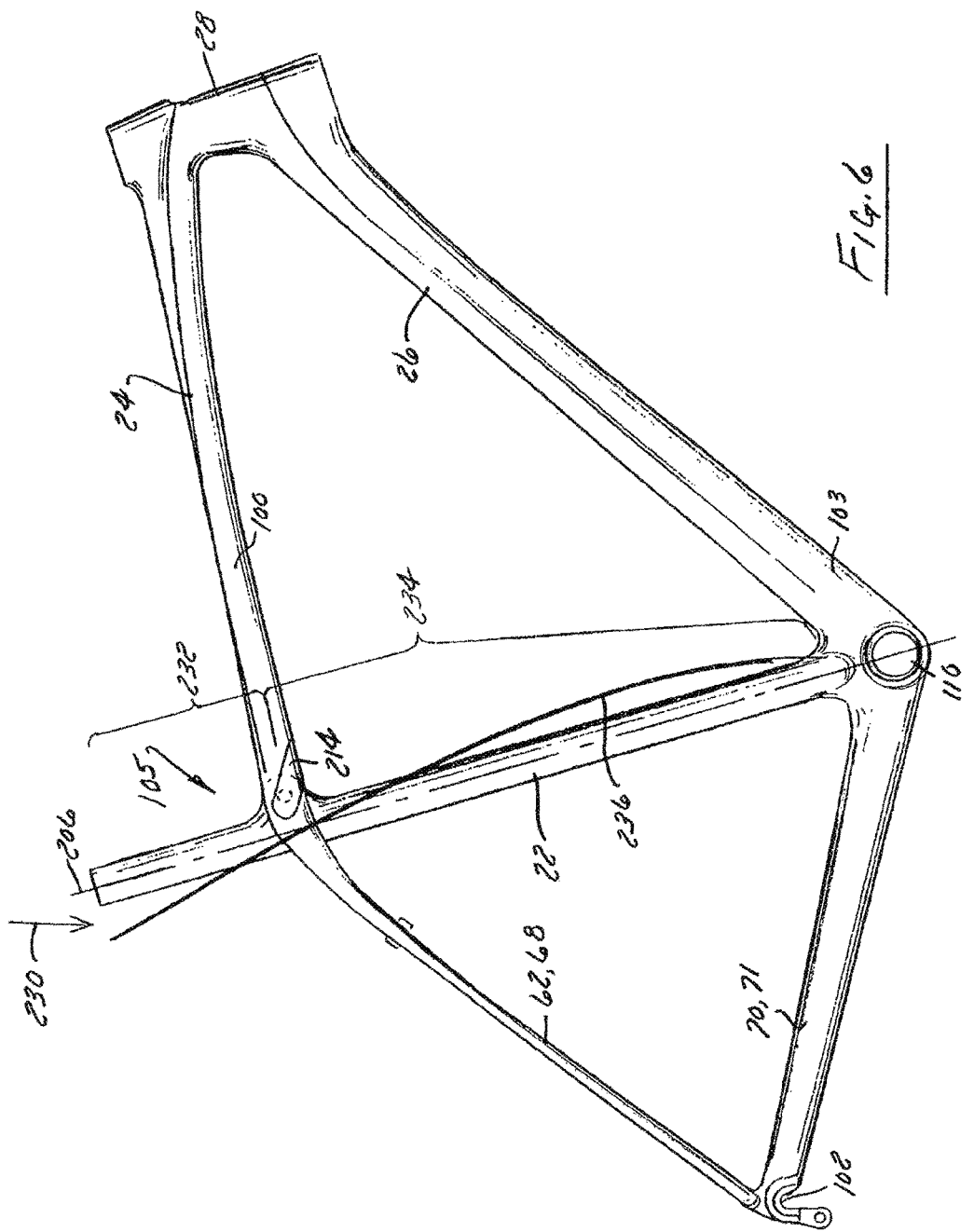
FIG. 6 is a side elevation view of the bicycle frame assembly shown in FIG. 2 and shows the loaded and loaded configurations of the seat tube associated with use of the bicycle frame assembly.

As mentioned above, other interactions between adjustable seat tube 22 and frame assembly 12 are envisioned that allow similar deflection of the adjustable seat tube 22. For instance, adjustable seat tube 22 could include a passage like passage 130 or otherwise be contoured so that the seat tube passed around the top tube/seat stays/lug and/or such that the top tube/seat stays/lug pass through the seat tube. Still another alternative includes connecting the seat stays to the upper frame member or top tube at a location forward of the seat tube such that the seat tube would be positioned in an area generally flanked by the seat stays. Referring to FIG. 6, although an axis, indicated by line 180, of pivot assembly 120 is offset in an forward direction relative to the longitudinal axis 206 of adjustable seat tube 22, is appreciated that axis 180 could be oriented to intersect axis 206 or offset in a rearward direction relative thereto so as to alter the deflection performance of adjustable seat tube 22 and/or to better suit the preferences of a given rider or class of users.

Referring to FIG. 6, during normal use of frame assembly 12, adjustable seat tube 22 maintains a generally "at rest" configuration as represented by adjustable seat tube 22 shown in FIG. 6. The adjustable seat tube 22 can have a fairly linear at rest orientation. Understandably, during normal use, some initial deflection of adjustable seat tube 22 may occur depending on the weight and preferred orientation of the rider during normal use over relatively smooth terrain. During an impact event, indicated by arrow 230, a downward and rearward bending moment is imparted to adjustable seat tube 22 by the interaction of the rider with the rear portion of a saddle, which is commonly offset to the rear of the longitudinal centerline 206 of adjustable seat tube 22. Such loading of the seat tube allows seat tube 22 to pivot in a passive manner about pivot assembly 120 and results in a rearward deflection of an upper portion 232 of adjustable seat tube 22 positioned above pivot assembly 120 and a forward deflection of a lower portion 234 of adjustable seat tube 22 that is positioned between pivot assembly 120 and bottom bracket 110 relative to the at-rest orientation.

The deflection of adjustable seat tube 22 relative to upper frame member 100 and lower frame member 101 is shown graphically in FIG. 6 by line 236. Such a configuration allows near the entirety of adjustable seat tube 22 to deflect from an at rest position to a "bent" orientation, represented by line 236 to improve the vertical compliance of frame assembly 12. Supporting an upper end of adjustable seat tube 22 proximate the intersection of adjustable seat tube 22 with upper frame member 100 provides a fairly rigid feel of frame assembly 12 during all riding conditions but mitigates the communication of undampened travel surface discontinuities to the rider via rider interaction with the bicycle seat. Such performance improves rider comfort and decreases rider discomfort commonly associated with extended rides. In one embodiment, adjustable seat tube 22 deflects no more than 15 degrees from an at rest orientation and more preferably, adjustable seat tube 22 deflects no more than 7 degrees from a rest position in response to rider interaction with seat 16. Such a configuration has been shown to provide a desired degree of responsiveness to rider interaction with the bicycle frame and does so in a manner that improves the vertical compliance of the bicycle frame assembly without unduly detracting from the same. However, it is appreciated that any desired range of deflection can be provided. In one embodiment, the greatest deflection value is associated with a deflection that a rider will tolerate and still feel comfortable on the bicycle during most riding conditions to a near unperceivable deflection during most riding conditions.

As shown in the experimental data below for an unadjustable seat tube, frame assembly 12 provides greater longitudinal deflection of the seat tube with comparable lateral stiffness for bicycle frames having similar shapes and with nearly negligible contribution to the overall weight of the bicycle frame assembly. It is further envisioned that the forward and/or rearward orientation of the pivot axis relative to the longitudinal axis of the seat tube can be manipulated to satisfy a wide variety of rider performance preferences and/or to alter the deflection performance of the seat tube. It is further appreciated that the construction of the seat tube can be manipulated to further alter the vertical compliance of the frame assembly while providing a robust bicycle frame assembly.

| Description | Size | Frame Sample # | Weight (gram) | Full Frame Torsional Stiffness (inches) | Head Tube Stiffness N * m per degree | BB Horizontal deflection (2) inches | Vertical Compliance (inches) |
| --- | --- | --- | --- | --- | --- | --- | --- |
| 6SRS Baseline | 56 H3 | 2011-5428 | 850 | 0.1885 | 78 | 56 | 0.86 |
| 6SRS Pivot (Unadjustable) | 56 H3 | 2011-5697 | 898 | 0.186 | 79* | 54 | 1.38 |

As shown in the data provided above, configuring a bicycle frame with the passive pivot connection between the seat tube and the upper frame member provides improved vertical compliance of the un-adjustable seat tube of approximately 60% with an increase in frame assembly weight of approximately 48 grams or only approximate 5% of the overall weight of the frame assembly. Accordingly, bicycle frame assembly 12 provides a bicycle frame having acceptable frame responsiveness with improved vertical compliance for improving rider comfort.

Figure 7:
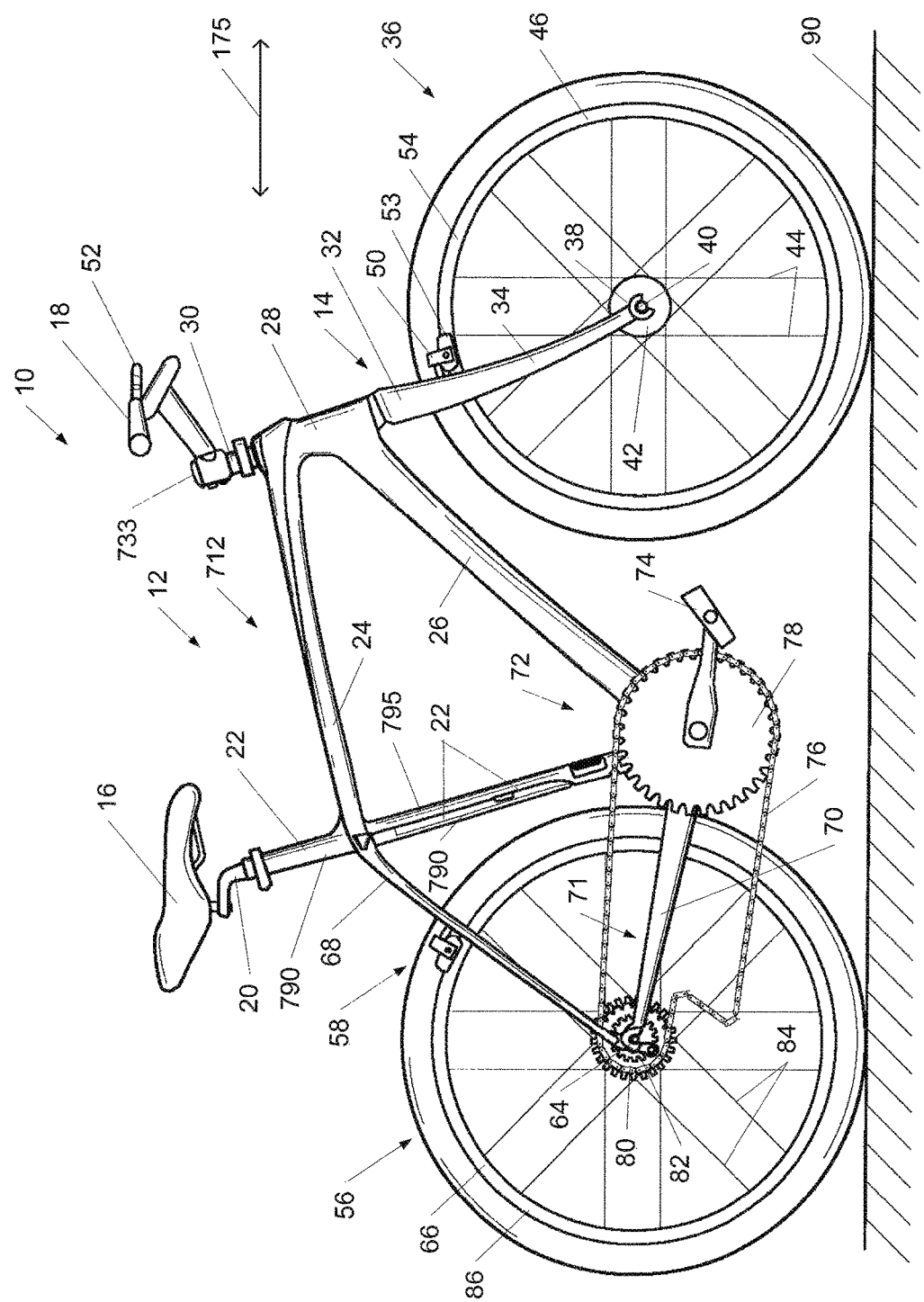
FIG. 7 is a side view of a first embodiment of the bicycle 10 in accordance with an illustrative embodiment.
Figure 8:
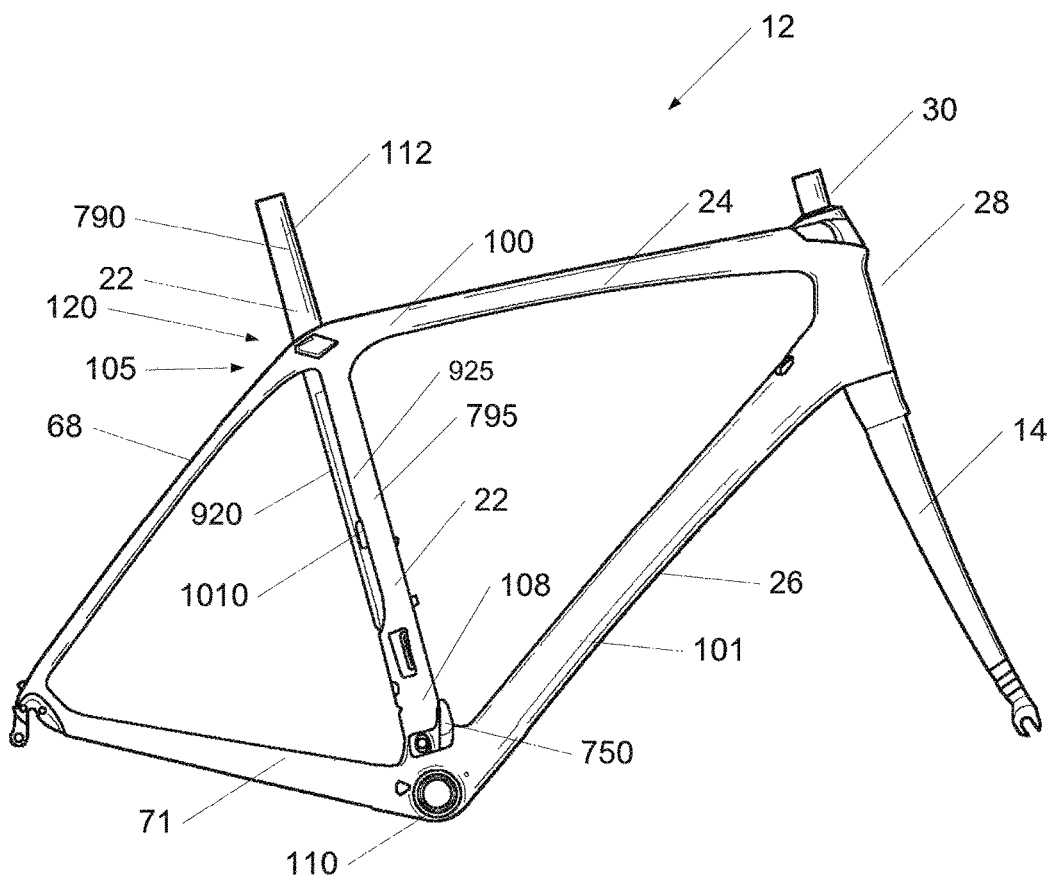
FIG. 8 is a side view of a first embodiment of the frame assembly 12 of FIG. 7 in accordance with an illustrative embodiment.
Figure 9:
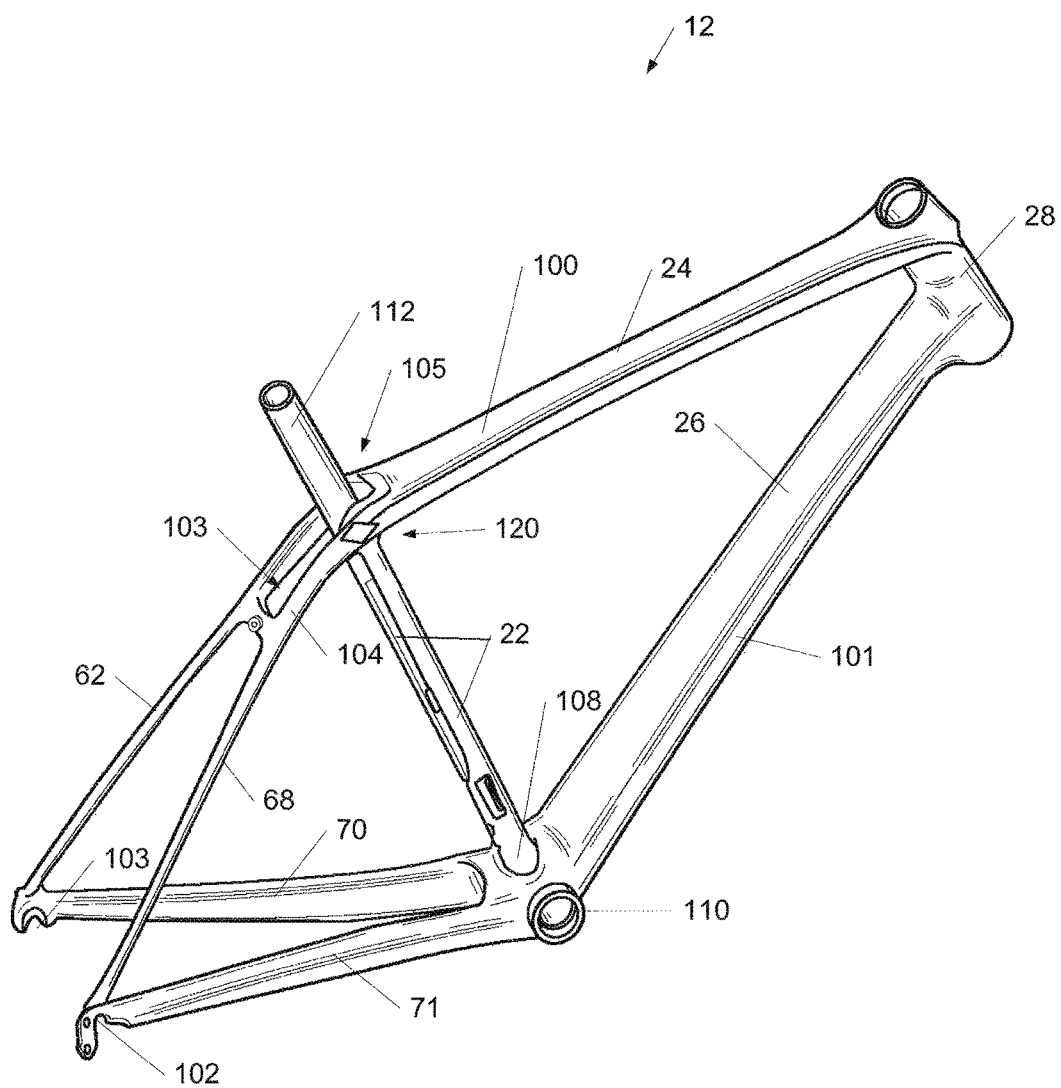
FIG. 9 is a perspective view of a first embodiment of the frame assembly 12 of FIG. 7 in accordance with an illustrative embodiment.
Figure 10:
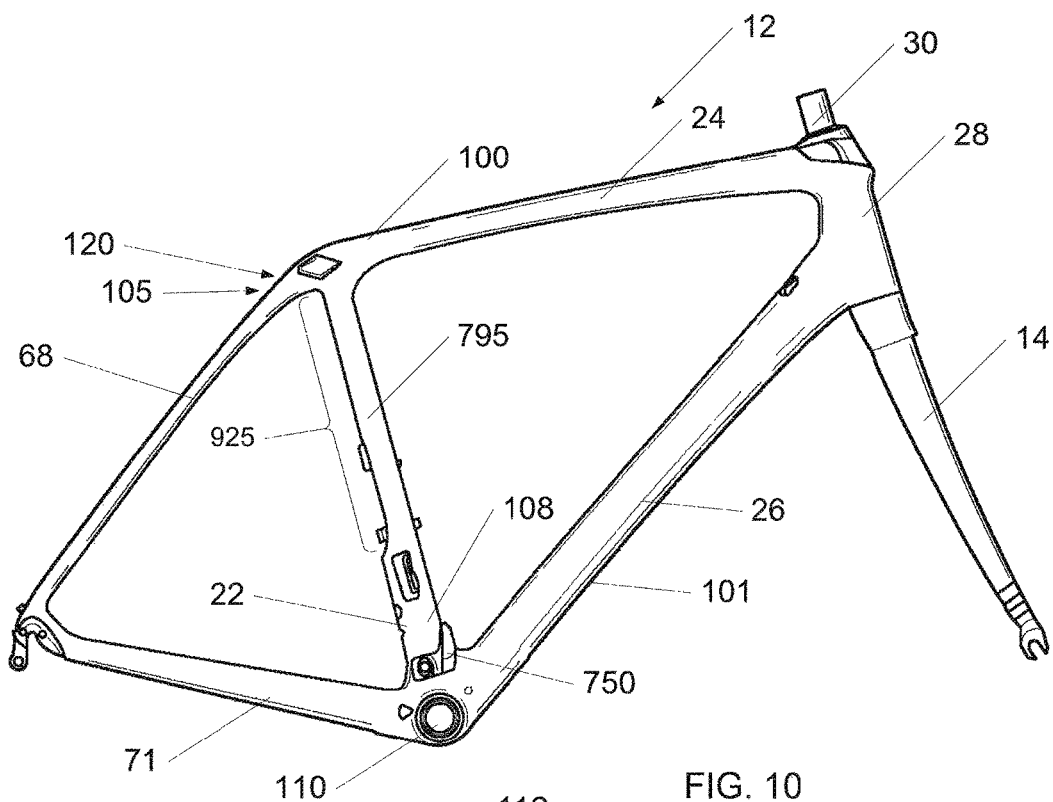
FIG. 10 is a side view of a frame 712 of the frame assembly 12 of FIG. 7 in accordance with an illustrative embodiment.
Figure 11:
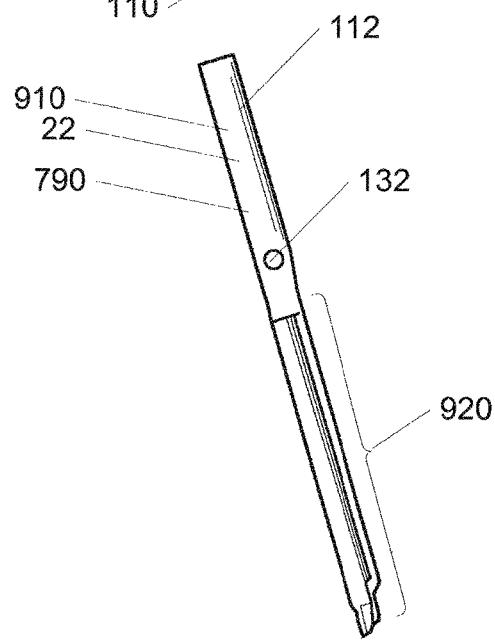
FIG. 11 is a side view of an upper seat mast 790 of the frame assembly 12 of FIG. 7 in accordance with an illustrative embodiment.
Figure 12:
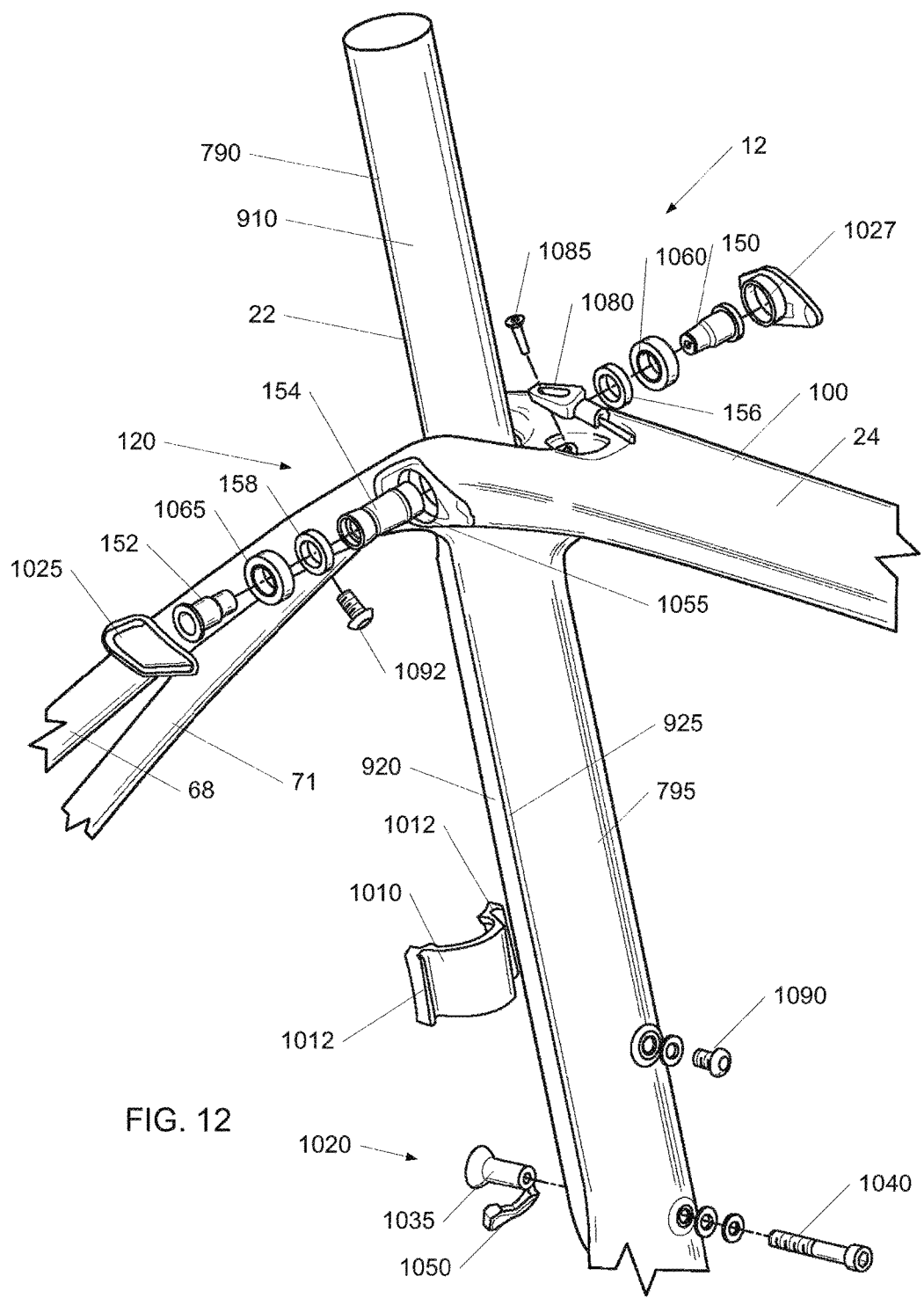
FIG. 12 is a perspective view of the passive pivot assembly 120 of the frame assembly 12 of FIG. 7 in accordance with an illustrative embodiment.
Figure 13:
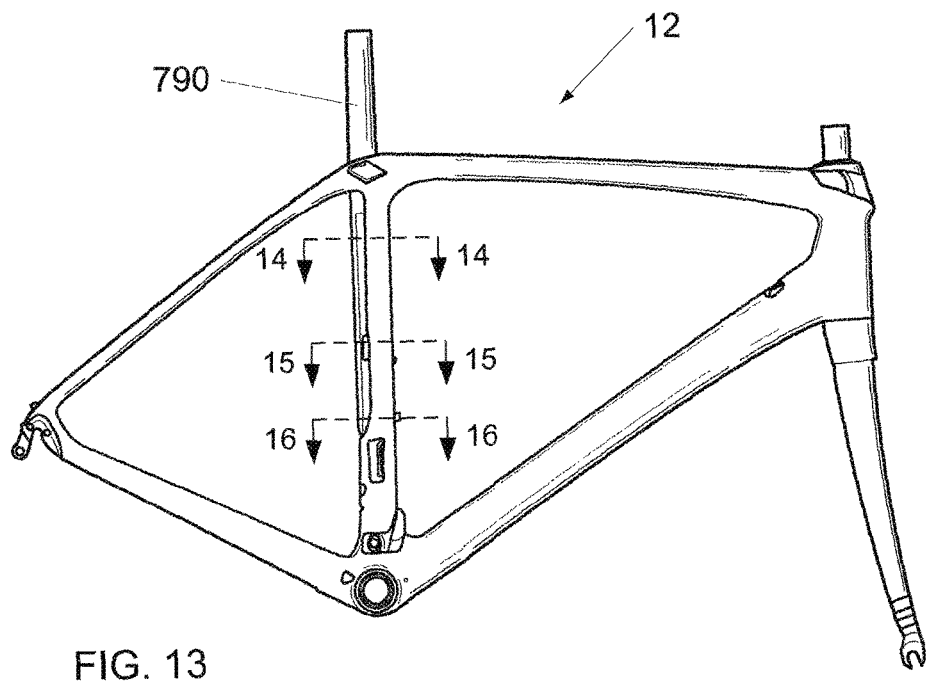
FIG. 13 is a side sectioning view of the frame assembly 12 of FIG. 7 in accordance with an illustrative embodiment.
Figure 14:
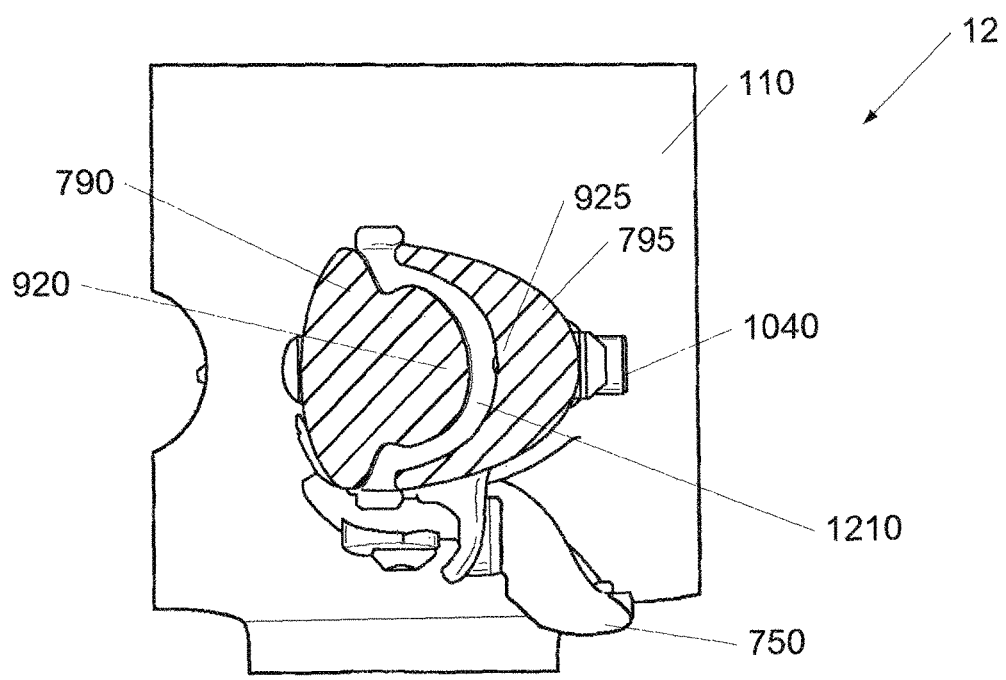
FIG. 14 is a top section view of Section 14-14 of the frame assembly 12 of FIG. 7 in accordance with an illustrative embodiment.
Figure 15:
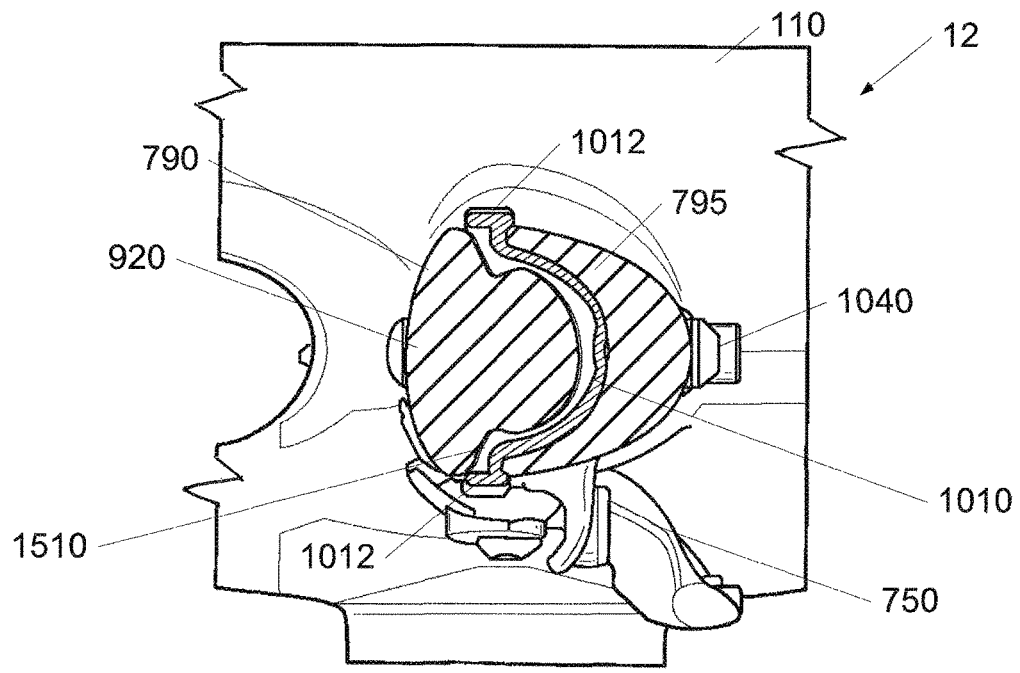
FIG. 15 is a top section view of Section 15-15 of the frame assembly 12 of FIG. 7 in accordance with an illustrative embodiment.
Figure 16:
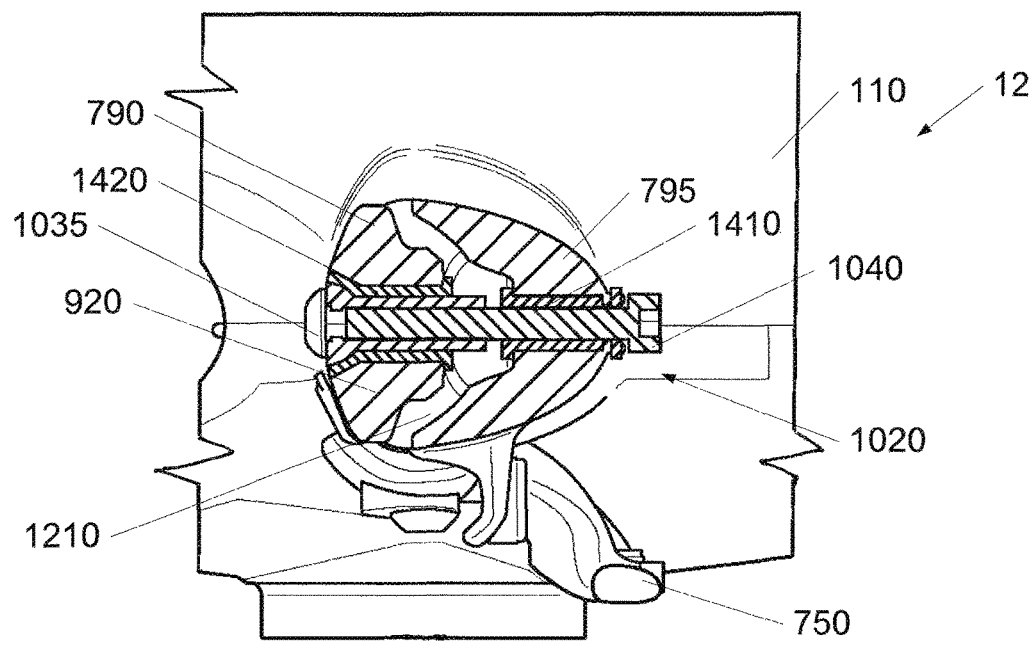
FIG. 16 is a top section view of Section 16-16 of the frame assembly 12 of FIG. 7 in accordance with an illustrative embodiment.

Referring now to FIG. 7, a side view of a first embodiment of the bicycle 10 in accordance with an illustrative embodiment is shown. Referring now to FIG. 8, a side view of a first embodiment of the frame assembly 12 of FIG. 7 in accordance with an illustrative embodiment is shown. Referring now to FIG. 9, a perspective view of a first embodiment of the frame assembly 12 of FIG. 7 in accordance with an illustrative embodiment is shown. Referring to FIG. 10, a side view of a frame 712 of the frame assembly 12 of FIG. 7 in accordance with an illustrative embodiment is shown. Referring to FIG. 11, a side view of an upper seat mast 790 of the frame assembly 12 of FIG. 7 in accordance with an illustrative embodiment is shown. Referring to FIG. 12, a perspective view of the passive pivot assembly 120 of the frame assembly 12 of FIG. 7 in accordance with an illustrative embodiment is shown. Referring to FIG. 13, a side sectioning view of the frame assembly 12 of FIG. 7 in accordance with an illustrative embodiment is shown. Referring to FIG. 14, a top section view of Section 14-14 of the frame assembly 12 of FIG. 7 in accordance with an illustrative embodiment is shown. Referring to FIG. 15, a top section view of Section 15-15 of the frame assembly 12 of FIG. 7 in accordance with an illustrative embodiment is shown. Referring to FIG. 16, a top section view of Section 16-16 of the frame assembly 12 of FIG. 7 in accordance with an illustrative embodiment is shown. Referring to FIG. 17, a top sectioning view of the frame assembly 12 of FIG. 7 in accordance with an illustrative embodiment is shown. Referring to FIG. 18, a side section view of Section 18-18 of the adjustable seat tube 22 area of the frame assembly 12 of FIG. 7 in accordance with an illustrative embodiment is shown. Referring to FIG. 19, a side section view of Detail 19 of the frame assembly 12 of FIG. 7 in accordance with an illustrative embodiment is shown. Referring to FIG. 20, a side section view of Detail 20 of the frame assembly 12 of FIG. 7 in accordance with an illustrative embodiment is shown.

In a first embodiment, the adjustable seat tube 22 can include an upper seat mast 790 and a lower seat mast 795. At least a portion of the upper seat mast 790 and at least a portion of the lower seat mast 795 can overlap. In one embodiment, an upper adjustment portion 920 of the upper seat mast 790 and a lower adjustment portion 925 of the lower seat mast 795 overlap for at least half of the length of the lower seat mast 795. The facing portions of the upper adjustment portion 920 and the lower adjustment portion 925 can generally loosely match each other, that is, a gap 1210 can be located between the upper adjustment portion 920 and the lower adjustment portion 925. The passive pivot assembly 120 can be associated with the upper seat mast 790. In one embodiment, the lower seat mast 795 can be attached to the bottom bracket 110 and the upper frame member 100. The frame 712 can also include a mounts 750 associated with the lower seat mast 795. The upper seat mast 790 can include a seat post portion 910 for mounting a seat post or saddle. The upper mast 790 can include features to prevent contamination in a vertical plane from the back of the bike, for example, gaskets, shrouding, etc. In one embodiment, a highly compressible gasket can be disposed of in the circumference of the gap 1210 to prevent dirt from entering the gap 1210. The mounts 750 can be used to, for example, attach a derailleur, attach a chain keep, or attach a sensor. In an alternative embodiment, the lower seat mast 795 can be attached only to the bottom bracket 110.

The passive pivot assembly 120 can include a first shroud 1025, a first fastener 152, a first bearing 1065, a first spacer 158, a guide sleeve 154, a second spacer 156, a second bearing 1060, a second fastener 150, and a second shroud 1027. The guide sleeve 154 can be inserted in the opening 132 of the upper seat mast 790. An outer race of the first bearing 1065 can sit on a seat 1055. An inner race of the first bearing 1065 can be mechanically coupled to the guide sleeve 154 by first spacer 158. The first fastener 152 can be inserted through the first bearing 1065 and the first spacer 158 and threaded into the guide sleeve 154. When the first fastener 152 is tightened, the outer race of the first bearing 1065 seats on the seat 1055 and the inner race of the first bearing 1065 couples to the guide sleeve 154, thereby loading the first bearing 1065. The preload of the first bearing 1065 can be changed by tightening or loosening the first fastener 152. An inner race of the second bearing 1060 can be mechanically coupled to the guide sleeve 154 by second spacer 156. The second fastener 150 can be inserted through the second bearing 1060 and the second spacer 156 and threaded into the guide sleeve 154. When the second fastener 150 is tightened, the outer race of the second bearing 1060 seats on a (second, opposite side of seat 1055) seat (not shown) and the inner race of the second bearing 1060 couples to the guide sleeve 154, thereby loading the second bearing 1060. The preload of the second bearing 1060 can be changed by tightening or loosening the second fastener 150. In an alternative embodiment, the first bearing 1065 and the second bearing 1060 can be a bushing.

An adjustment sleeve 1010 can be located between the at least a portion of the upper seat mast 790 and the at least a portion of the lower seat mast 795 that overlap. In a loosened state of the upper seat mast 790 and a lower seat mast 795, the adjustment sleeve 1010 can slide within the gap 1210. The adjustment sleeve 1010 can include finger grips 1012. A user can use the finger grips 1012 to move the adjustment sleeve 1010 higher or lower within the gap. In one embodiment, the adjustment sleeve 1010 can include a gasket 1510.

The adjustable seat tube 22 can include an adjustment locking assembly 1020. The adjustment locking assembly 1020 can include a nut portion 1035 and insert 1420 associated with the upper seat mast 790 and a bolt portion 1040 and insert 1410 associated with the lower seat mast 795. The adjustment locking assembly 1020 can include a gasket 1050. When the adjustment locking assembly 1020 is tightened, the adjustment sleeve 1010 can be locked between the upper seat mast 790 and the lower seat mast 795. When the adjustment locking assembly 1020 is loosened, the adjustment sleeve 1010 can be moved within the gap 1210 between the upper seat mast 790 and the lower seat mast 795. The user can move the adjustment sleeve 1010 higher or lower within the gap to change the stiffness of the adjustable seat tube 22. The adjustment sleeve 1010 can be made of different materials and thicknesses to provide difference compliance characteristics. In another embodiment, the adjustment sleeve 1010 can be provided in varying lengths to provide difference compliance characteristics. In another embodiment, the adjustment sleeve 1010 can be provided in varying shapes to provide difference compliance characteristics; for example, the surface of the adjustment sleeve 1010 can have ribbing.

The frame assembly 12 can also include a brake bolt 1092 for mounting a brake. The frame assembly 12 can also include a cable stop 1080 and a cable stop mounting bolt 1085. The frame assembly 12 can also include an accessory mounting bolt 1090.

Figure 21:
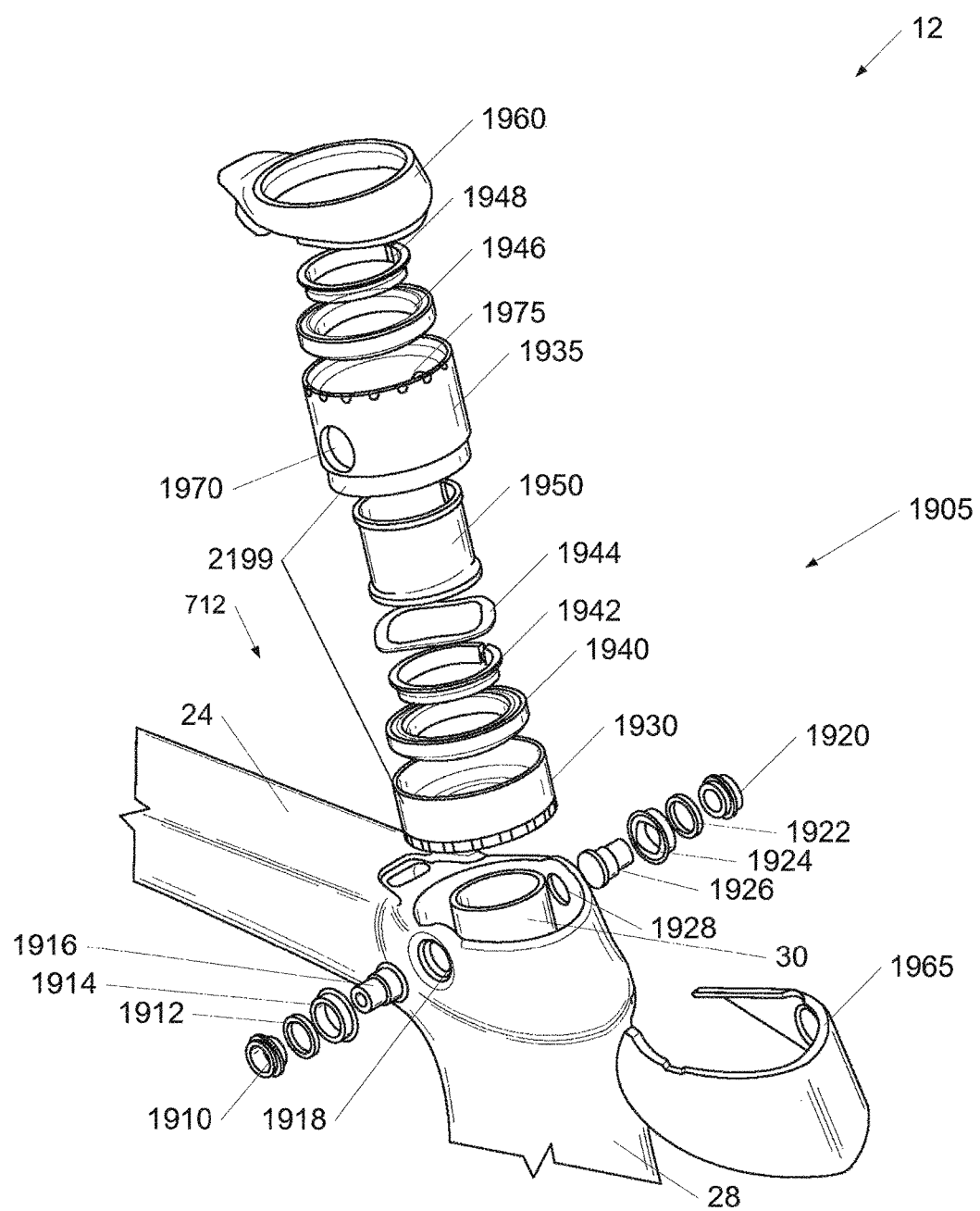
FIG. 21 is a perspective assembly view of a second embodiment of the frame assembly 12 in accordance with an illustrative embodiment.
Figures 22, 23:
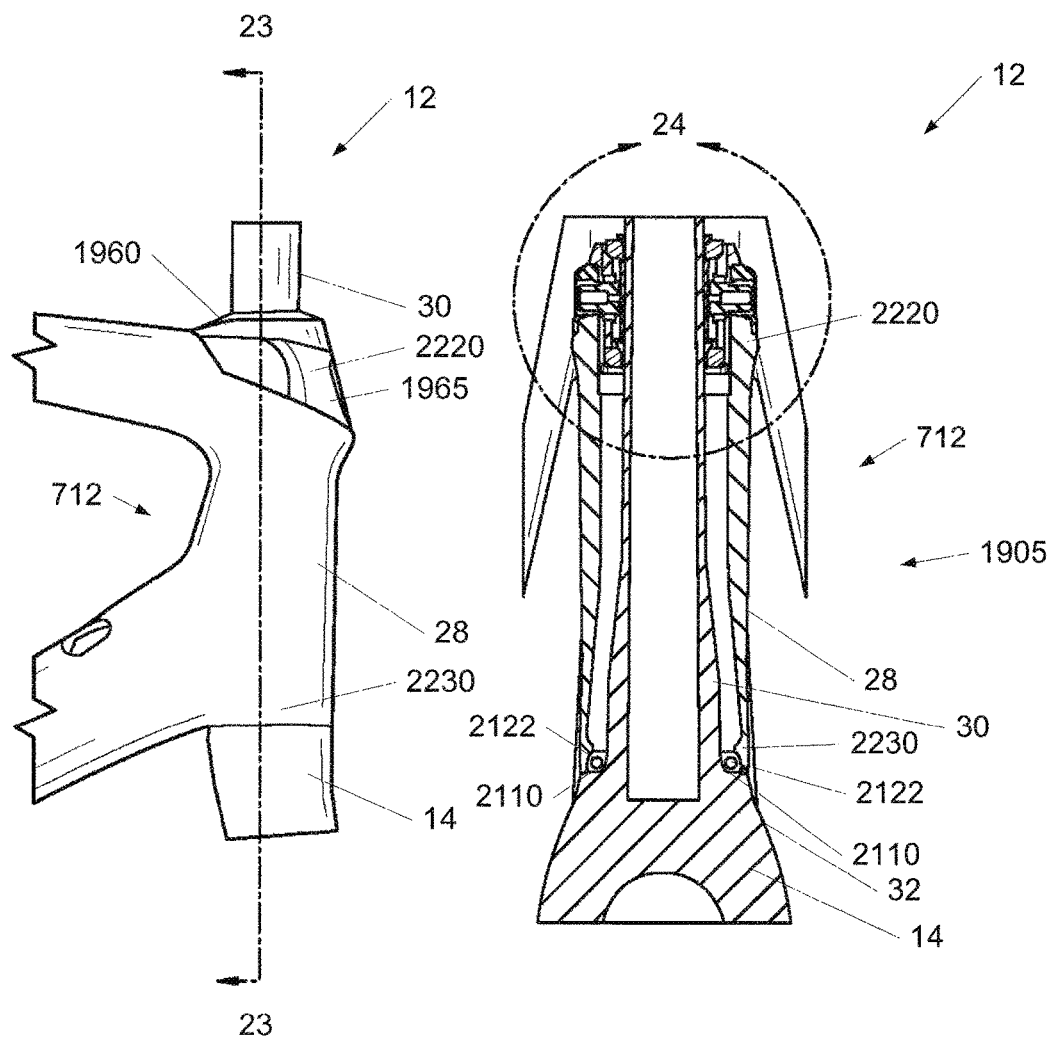
FIG. 22 is a side sectioning view of the head tube 28 of the second embodiment of the frame assembly 12 of FIG. 21 in accordance with an illustrative embodiment.
FIG. 23 is a front section view Section 23-23 of the head tube 28 of the second embodiment of the frame assembly 12 of FIG. 21 in accordance with an illustrative embodiment.
Figure 24:
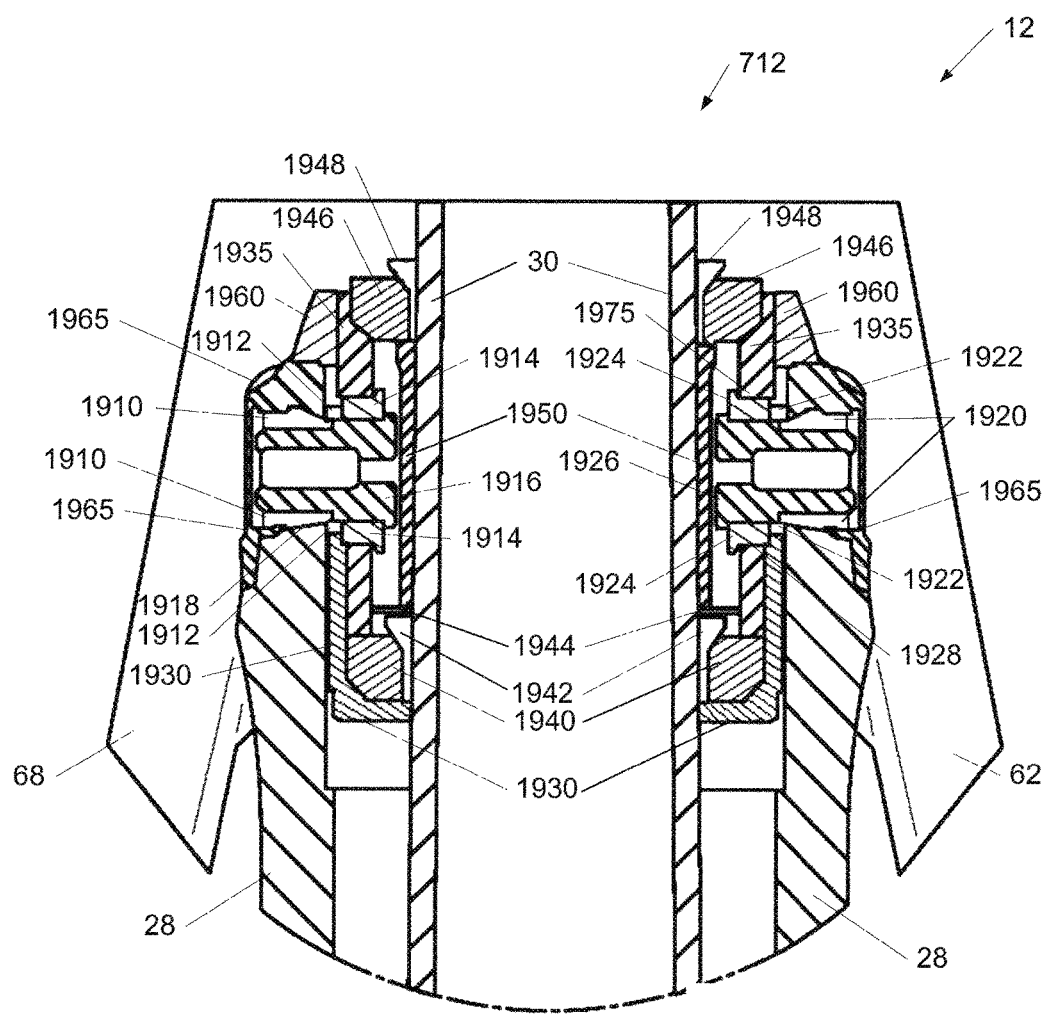
FIG. 24 is a front section view of Detail 24 of the second embodiment of the frame assembly 12 of FIG. 21 in accordance with an illustrative embodiment.
Figure 25:
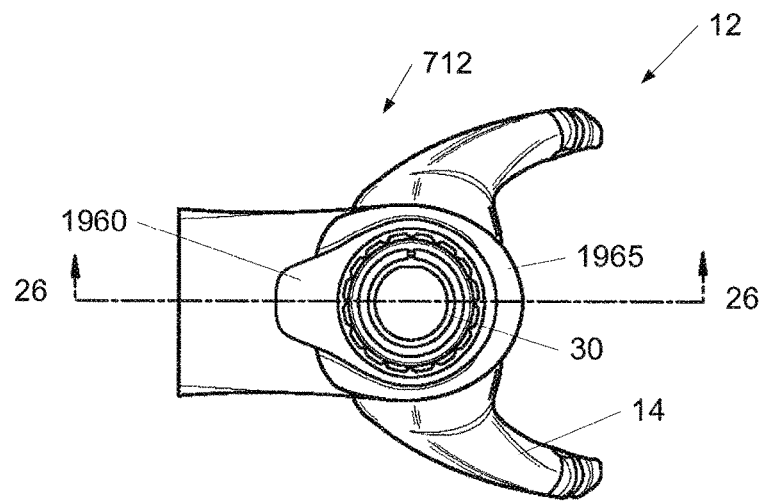
FIG. 25 is a top sectioning view of the head tube 28 of the second embodiment of the frame assembly 12 of FIG. 21 in accordance with an illustrative embodiment.
Figure 27:
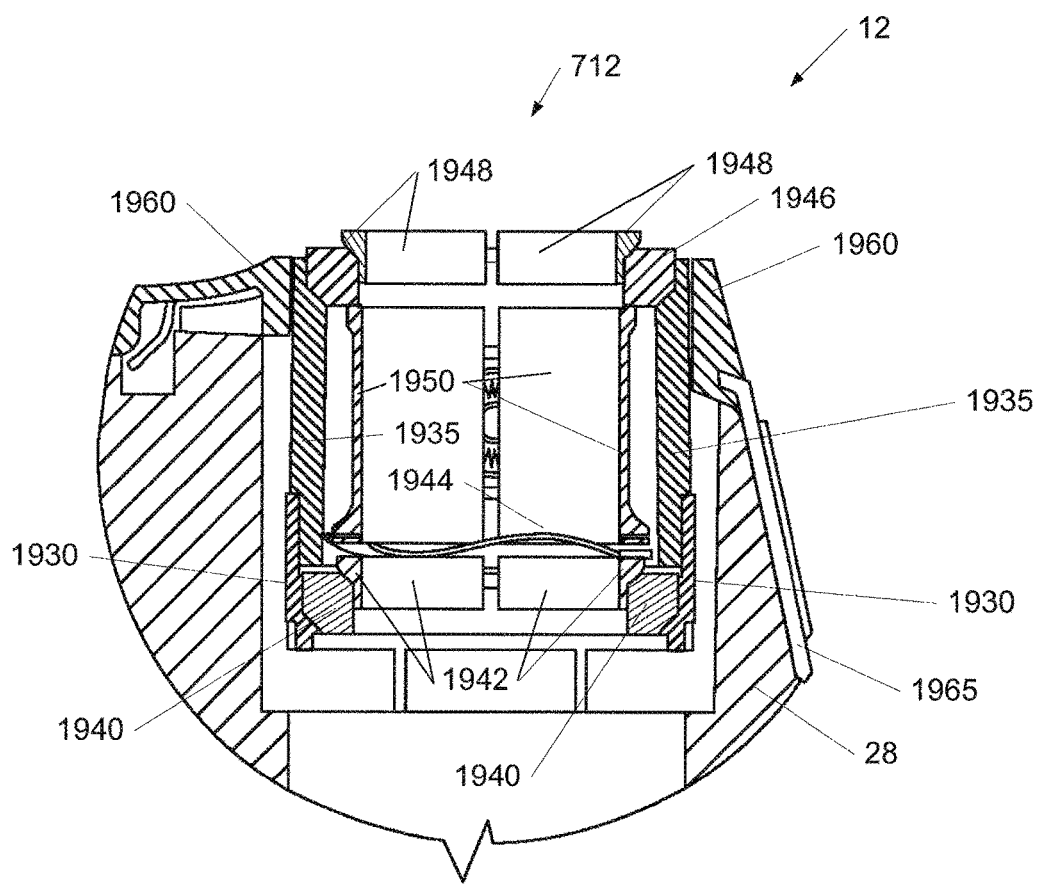
FIG. 27 is a side section view of Detail 27 of the second embodiment of the frame assembly 12 of FIG. 21 in accordance with an illustrative embodiment.
Figure 26:
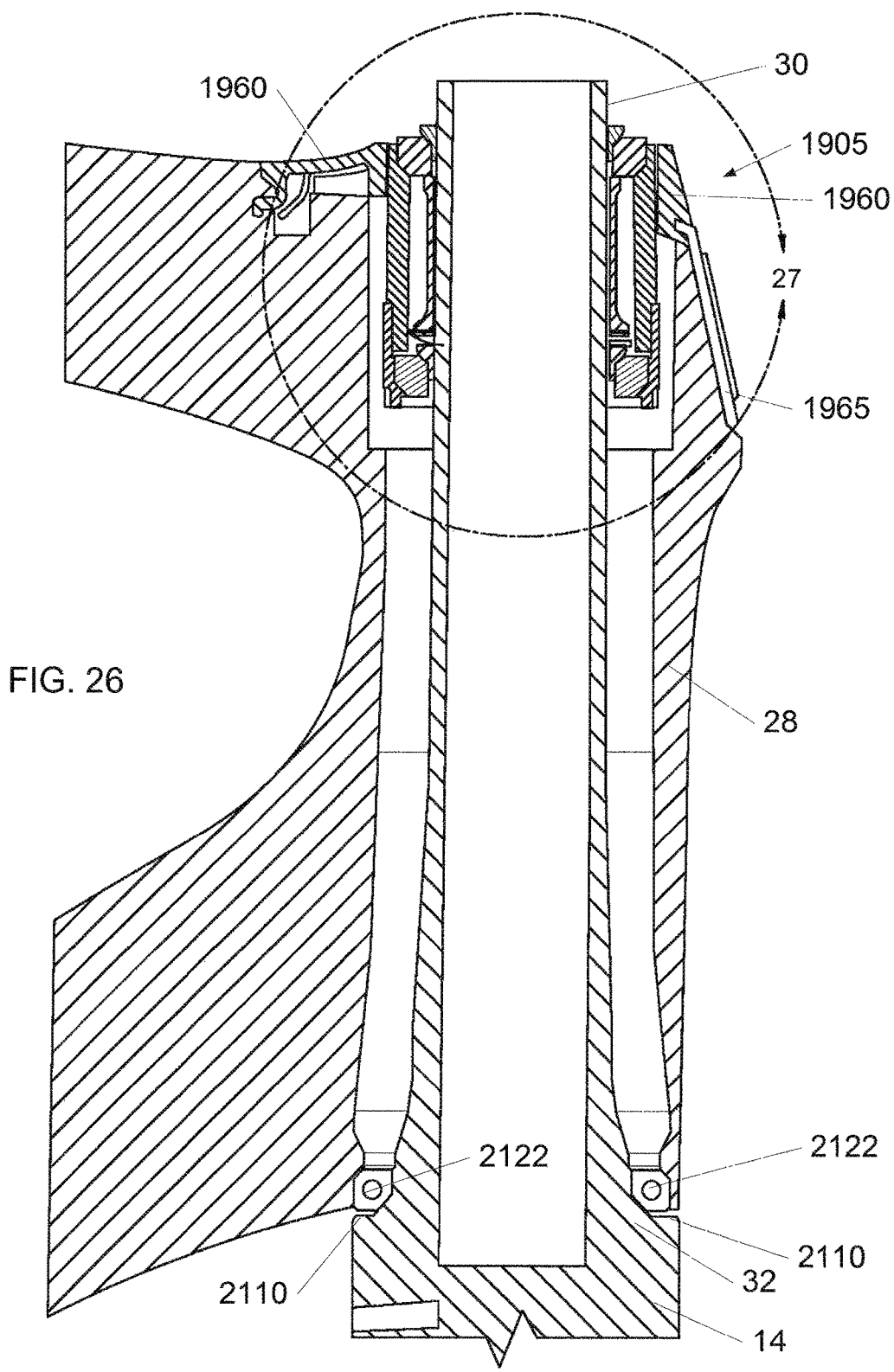
FIG. 26 is a side section view of Section 26-26 of the head tube 28 of the second embodiment of the frame assembly 12 of FIG. 21 in accordance with an illustrative embodiment.

Referring now to FIG. 21, a perspective assembly view of a second embodiment of the frame assembly 12 in accordance with an illustrative embodiment is shown. Referring to FIG. 22, a side sectioning view of the head tube 28 of the second embodiment of the frame assembly 12 of FIG. 21 in accordance with an illustrative embodiment is shown. Referring to FIG. 23, a front section view Section 23-23 of the head tube 28 of the second embodiment of the frame assembly 12 of FIG. 21 in accordance with an illustrative embodiment is shown. Referring to FIG. 24, a front section view of Detail 24 of the f second embodiment of the frame assembly 12 of FIG. 21 in accordance with an illustrative embodiment is shown. Referring to FIG. 25, a top sectioning view of the head tube 28 of the second embodiment of the frame assembly 12 of FIG. 21 in accordance with an illustrative embodiment is shown. Referring to FIG. 26, a side section view of Section 26-26 of the head tube 28 of the second embodiment of the frame assembly 12 of FIG. 21 in accordance with an illustrative embodiment is shown. Referring to FIG. 27, a side section view of Detail 27 of the second embodiment of the frame assembly 12 of FIG. 21 in accordance with an illustrative embodiment is shown.

A headset of frame 712 can include a compliant upper headset assembly 1905 and a lower headset bearing 2122. The compliant upper headset assembly 1905 can be located proximate to a top 2220 of the head tube 28. The lower headset bearing 2122 can be located proximate to a bottom 2230 of the head tube 28. The compliant upper headset assembly 1905 can include an upper shroud 1960, a bushing 1948, an upper bearing 1946, an upper cup 1935, a standoff 1950, a thrust washer 1944, a bushing 1942, a lower bearing 1940, a lower cup 1930, a lower shroud 1965, a first retainer 1910, a first spacer 1912, a first bushing 1914, a first pin 1916, a second retainer 1920, a second spacer 1922, a second bushing 1924, and a second pin 1926. The bushing 1948 can be a preload spacer or a compression ring. The bushing 1948 can be made, for example, of metal. The standoff 1950 can be a preload spacer or a compression ring. The standoff 1950 can be made, for example, of metal.

The upper cup 1935 can include a first cup opening 1970 and a second cup opening 1975. The first pin 1916 can be inserted in the first cup opening 1970 and the second pin 1926 can be inserted in the second cup opening 1975. The inside of the first bushing 1914 sits on the first pin 1916. The outside of the first bushing 1914 sits in a first frame opening 1918. The inside of the second bushing 1924 sits on the second pin 1926. The outside of the second bushing 1924 sits in a second frame opening 1928. Thus, the upper cup 1935 can rotate fore and aft on first pin 1916 and second pin 1926.

The lower cup 1930 can be coupled to the upper cup 1935; for example, the lower cup 1930 and the upper cup 1935 can be threaded together. The lower cup 1930 and the upper cup 1935, together, form cup 2199. Thus, the cup 2199 can rotate fore and aft on first pin 1916 and second pin 1926 relative to the head tube 28. The cup 2199 can be located at least partially within the head tube 28. Hence, the cup 2199 is gimbaled to the head tube 28.

The lower bearing 1940 can sit in the lower cup 1930. The standoff 1950, the thrust washer 1944, and the bushing 1942 can be associated with the inner race of the lower bearing 1940. The bushing 1948 and the upper bearing 1946 can rest on the standoff 1950. The steer tube 30 can be inserted through the bushing 1948, the upper bearing 1946, the upper cup 1935, the standoff 1950, the thrust washer 1944, the bushing 1942, the lower bearing 1940, and the lower cup 1930. A stem or steer tube cap 733 can be used to lock or secure the compliant upper headset assembly 1905 together. The lower headset bearing 2122 can sit on a crown seat 2110 of the crown 32. When the steer tube cap 733 is tightened, the bushing 1948, the upper bearing 1946, the upper cup 1935, the standoff 1950, the thrust washer 1944, the bushing 1942, and the lower bearing 1940 are preloaded.

The steer tube 30 can flex. In one embodiment, the steer tube 30 can be made of fiber reinforced plastic, such a carbon fiber in a plastic matrix. The flexure of the steer tube 30 can be controlled by the layering of the carbon fiber. In one embodiment, the steer tube 30 can be designed to flex more in a fore and aft direction as opposed to a side-to-side direction.

As noted above, the steer tube 30 is inserted through the cup 2199. As noted above, the cup 2199 can rotate fore and aft on first pin 1916 and second pin 1926. Hence, the rotatable cup 2199 allows the steer tube 30 to flex more than compared to a headset with fixed bearings. The upper bearing 1946 and the lower bearing 1940 allow the rider to rotate the steer tube 30, in order to turn the front wheel, even though the steer tube 30 is inserted through cup 2199. Advantageously, the fork 14 can flex more providing improved frame responsiveness with improved vertical compliance for improving rider comfort.

Figure 28:
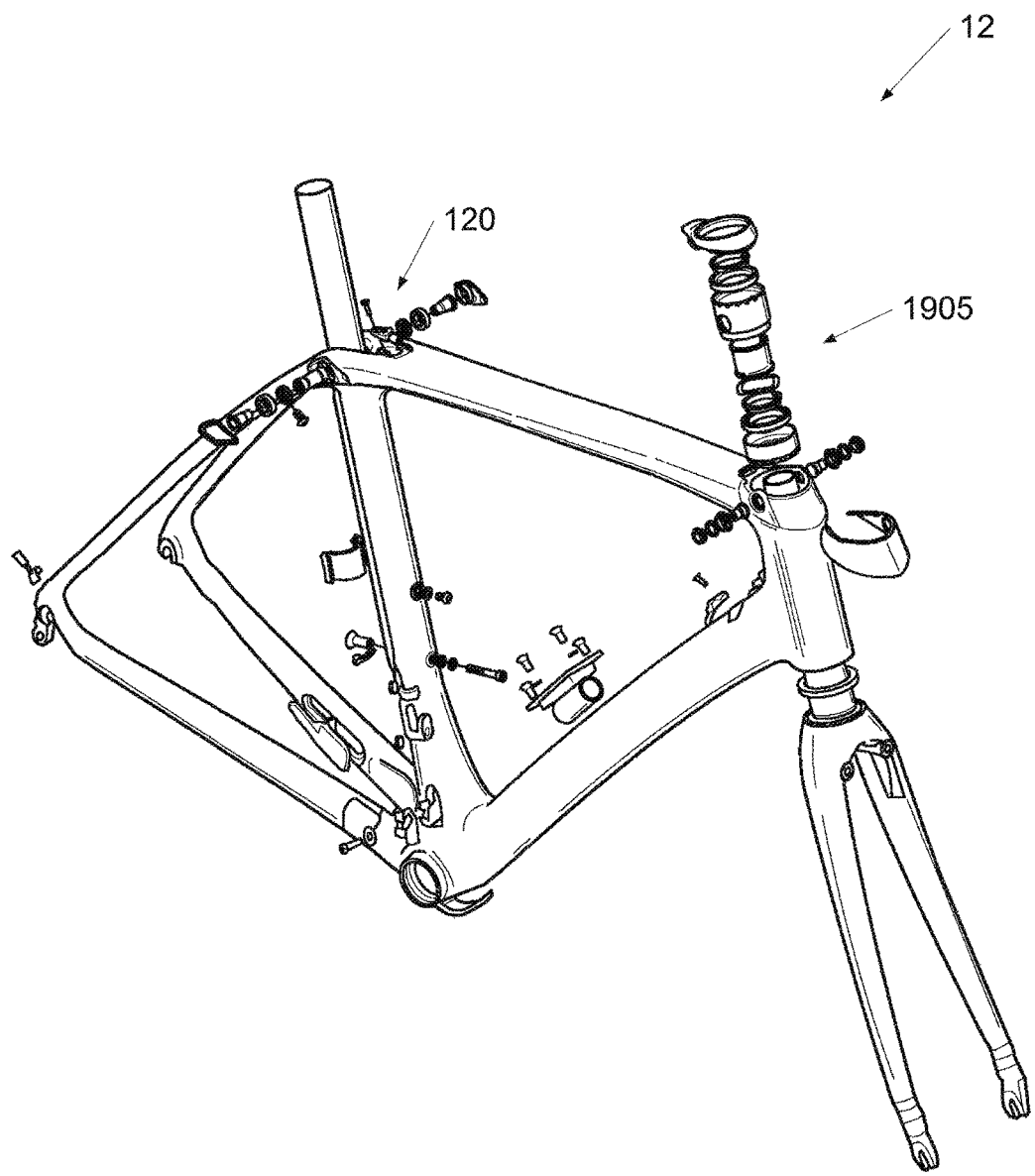
FIG. 28 is a perspective assembly view of frame assembly 12 including the first and second embodiments.

FIG. 28 shows a perspective assembly view of frame assembly 12 including the first and second embodiments. Advantageously, the adjustable seat tube 22 increases rider comfort and frame adaptability to riding conditions. Advantageously, the compliant upper headset assembly 1905 enables the steer tube 30 to flex more than a static upper headset bearing.

Figure 29:
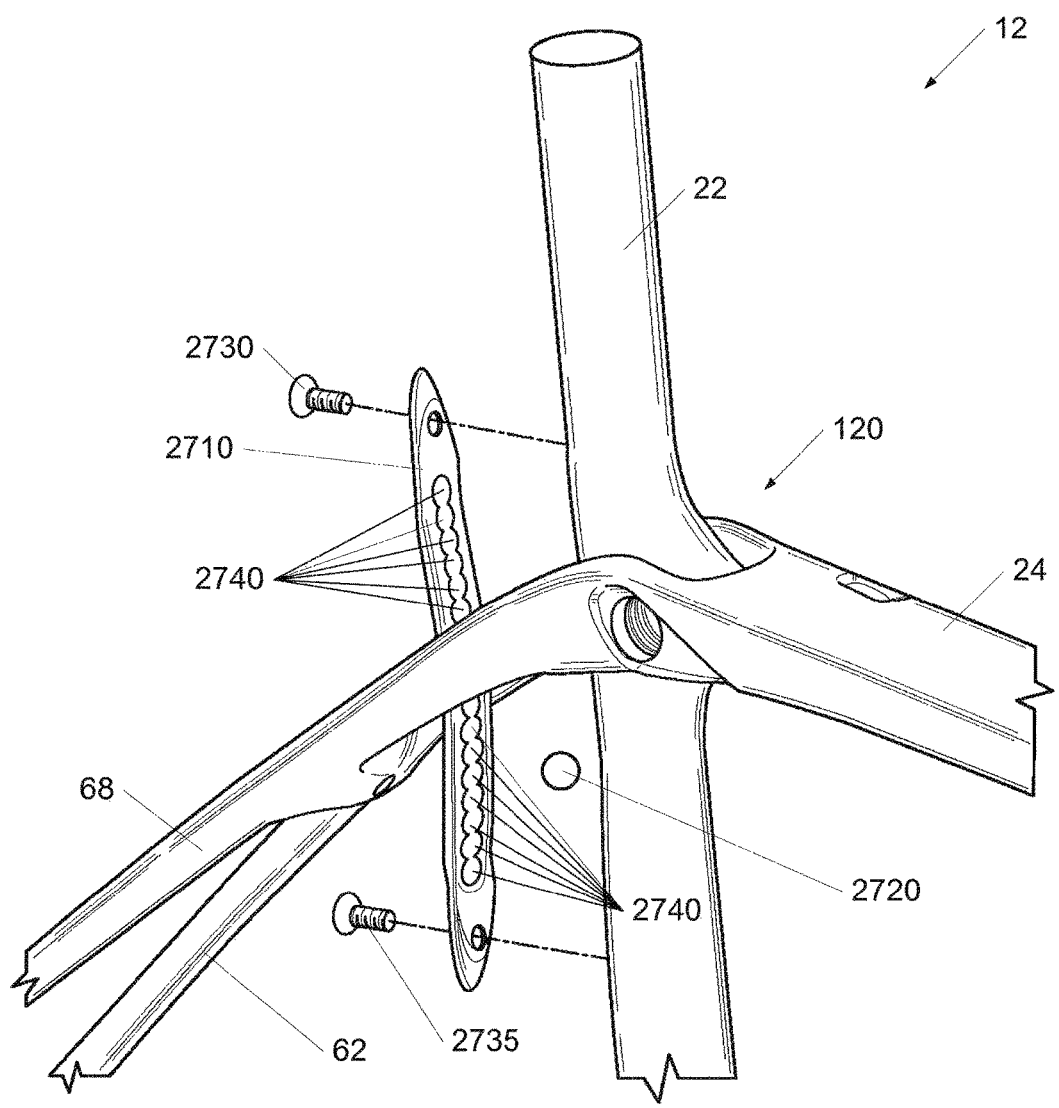
FIG. 29 is a perspective assembly view of a third embodiment of the frame assembly 12 in accordance with an illustrative embodiment.
Figure 30:
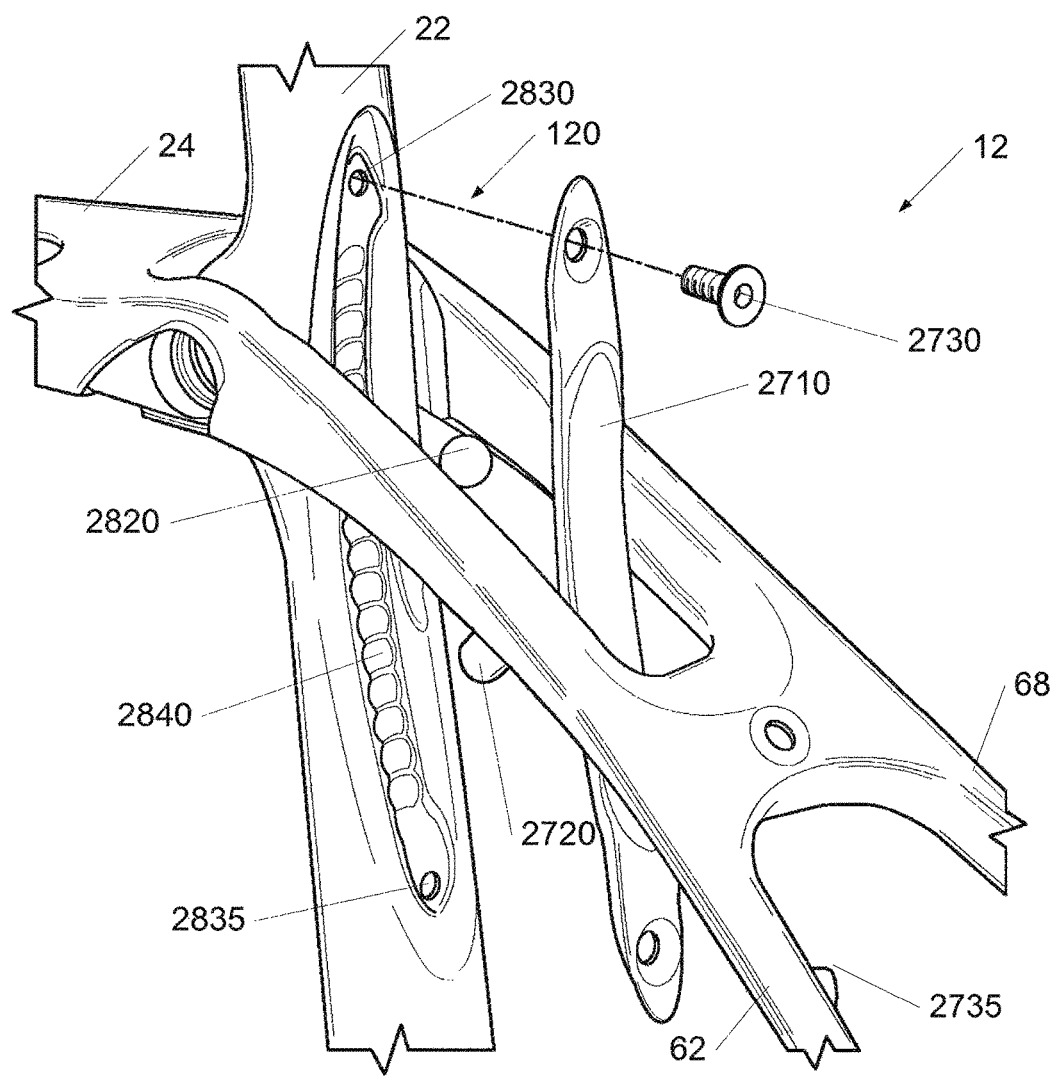
FIG. 30 is a second perspective assembly view of the third embodiment of the frame assembly 12 of FIG. 29 in accordance with an illustrative embodiment.
Figure 31:
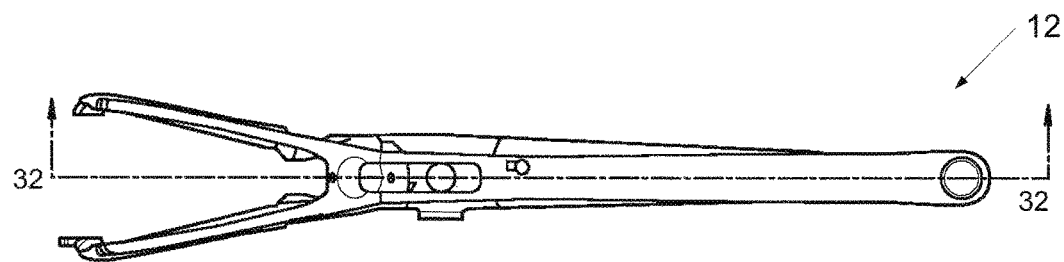
FIG. 31 is a top sectioning view of the third embodiment of the frame assembly 12 of FIG. 29 in accordance with an illustrative embodiment.
Figure 32:
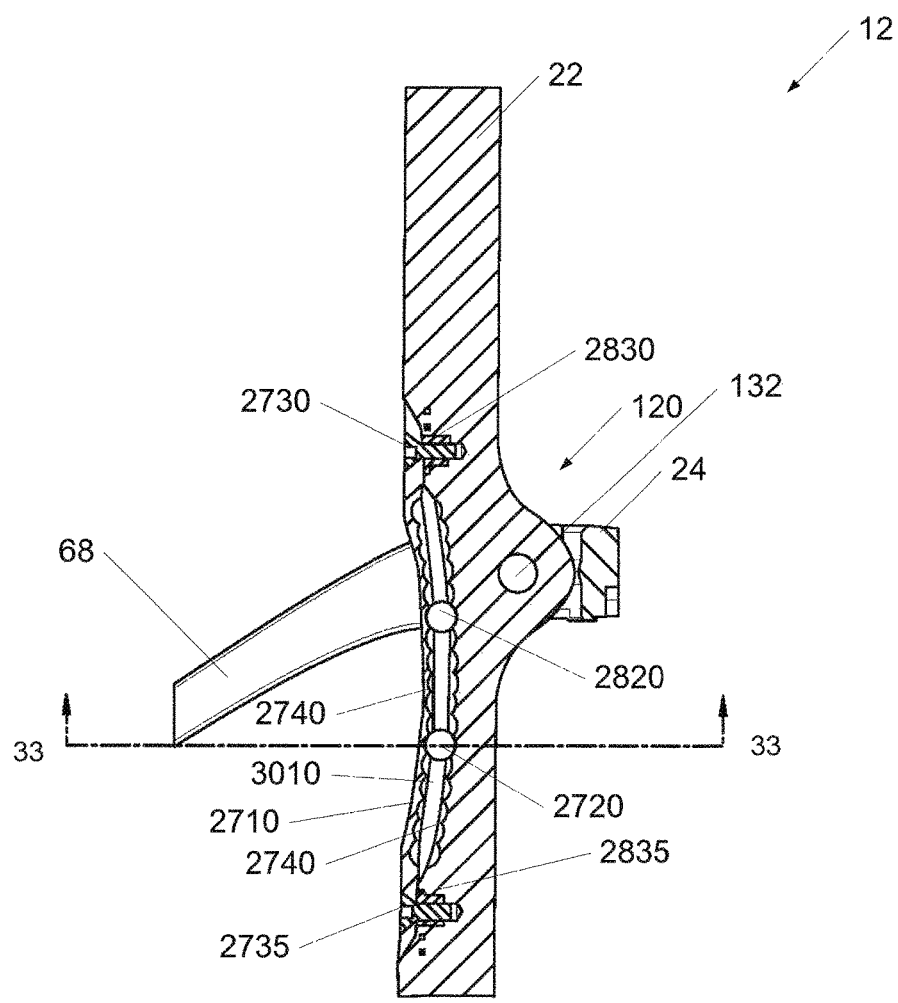
FIG. 32 is a side section view of Section 32-32 of the passive pivot assembly 120 of the third embodiment of the frame assembly 12 of FIG. 29 in accordance with an illustrative embodiment.
Figure 33:
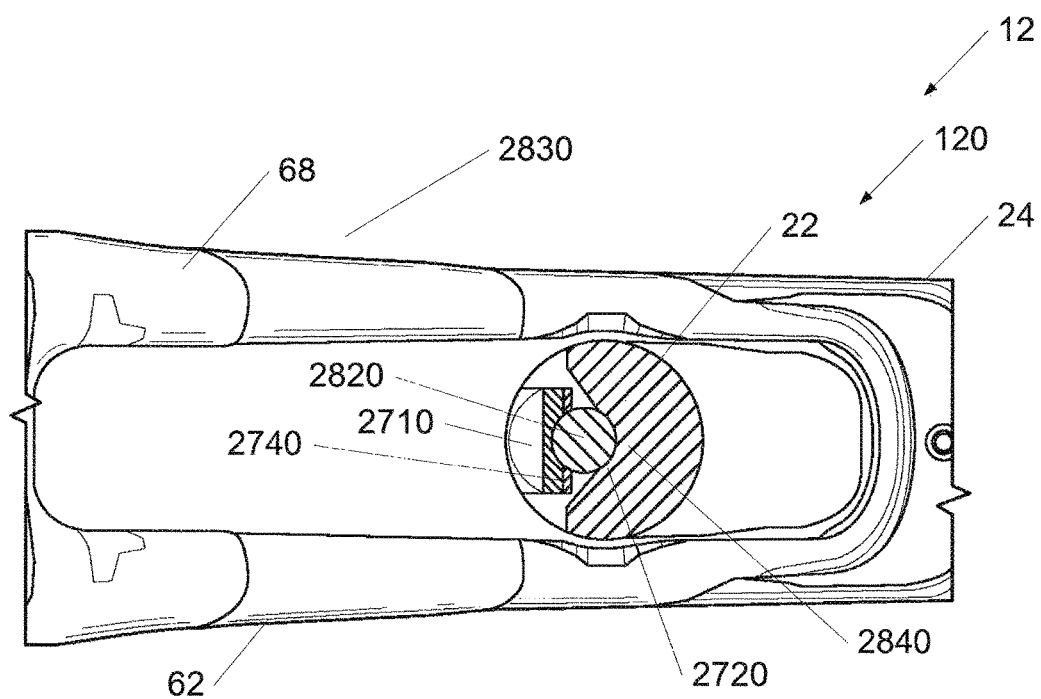
FIG. 33 is a bottom section view of Section 33-3 of the third embodiment of the frame assembly 12 of FIG. 29 in accordance with an illustrative embodiment.

Referring now to FIG. 29, a perspective assembly view of a third embodiment of the frame assembly 12 in accordance with an illustrative embodiment is shown. Referring to FIG. 30, a second perspective assembly view of the third embodiment of the frame assembly 12 of FIG. 29 in accordance with an illustrative embodiment is shown. Referring to FIG. 31, a top sectioning view of the third embodiment of the frame assembly 12 of FIG. 29 in accordance with an illustrative embodiment is shown. Referring to FIG. 32, a side section view of Section 32-32 of the passive pivot assembly 120 of the third embodiment of the frame assembly 12 of FIG. 29 in accordance with an illustrative embodiment is shown. Referring to FIG. 33, a bottom section view of Section 33-3 of the third embodiment of the frame assembly 12 of FIG. 29 in accordance with an illustrative embodiment is shown.

An adjustment plate 2710 can be coupled to the adjustable seat tube 22. The adjustment plate 2710 can include a series of first indents 2740. The adjustable seat tube 22 can include a series of second indents 2840. The adjustable seat tube 22 can include a first threaded hole 2830 and a second threaded hole 2835. The adjustment plate 2710 can be secured to the adjustable seat tube 22 by a first retaining bolt 2730 (associated with the first threaded hole 2830) and a second retaining bolt 2735 (associated with the second threaded hole 2835). The adjustment plate 2710 and the adjustable seat tube 22 can be separated by a gap 3010. The adjustment plate 2710 and the adjustable seat tube 22 can capture a first object 2720 and a second object 2820. The first object 2720 and the second object 2820 can sit in between first indents 2740 and second indents 2840. The first object 2720 and the second object 2820 can be a sphere, cylinder or any other shape. The user can loosen the adjustment plate 2710 and move the first object 2720 and the second object 2820 to different first indents 2740 and second indents 2840 pairs. One, two, three, or more objects can be placed in between first indents 2740 and second indents 2840. The first object 2720 and the second object 2820 can be made of metal, elastomer, plastic, fiber reinforce plastic, or any other material. In another embodiment, a strip of material can be placed in between the adjustment plate 2710 and the adjustable seat tube 22.

In alternative embodiments, interchangeable stiffening rods, tubes, or inserts can be placed inside the seat tube 22 along at least a portion of the length of the seat tube 22. In another embodiment, preload on the passive pivot assembly 120 can be increased or decreased to change the compliance (or flexibility) of the seat tube 22.

Therefore, one embodiment of the invention includes a bicycle frame assembly having a forward frame triangle that includes a top tube and a bottom tube. The top tube includes a first end that is connected to a head tube and a second end. The bottom tube includes a first end that is connected to the head tube and a second end. A bottom bracket is connected to the second end of the bottom tube. A seat tube extends in an upward direction from the bottom bracket. A pair of seat stays are connected to the top tube and extend in a rearward direction beyond the forward frame triangle. A pivot connects the seat tube to the forward frame triangle proximate the top tube at a location nearer a bicycle seat than the bottom bracket.

Another embodiment of the invention that includes one or more features combinable with the above embodiment includes a bicycle frame assembly having an upper frame member that includes a top tube and a pair of seat stays. The upper frame member extends between a dropout associated with a rear wheel and a head tube. An opening is formed in the upper frame member. A lower frame member that includes a bottom tube, a bottom bracket, and a chain stay extends between the dropout and the head tube. A seat tube extends from the lower frame member toward the upper frame member and passes through the opening in the upper frame member. A pivot connects the seat tube to the upper frame member proximate the opening so that more of the seat tube is located between the pivot and the bottom bracket than extends beyond the upper frame member.

Another embodiment of the invention that is useable with one or more of the aspects of the above embodiments discloses a method of allowing deflection of a seat tube. A seat tube is connected to a bottom bracket. The seat tube is connected to an upper frame member with a pivot that is located at an overlapping intersection of the seat tube and the upper frame member so that the seat tube can deflect from alignment along a line between the bottom bracket and the pivot.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A bicycle, comprising:
a forward frame triangle comprising:
a top tube having a first end connected to a head tube and a second end;
a down tube having a first end connected to the head tube and a second end;
a bottom bracket connected to the second end of the down tube;
a lower seat mast extending in an upward direction from the bottom bracket to the top tube; and
an upper seat mast at least partially overlapping the lower seat mast, wherein the upper seat mast is adjustably and fixedly coupled to the lower seat mast and the upper seat mast is rotably coupled to the forward frame triangle proximate the second end of the top tube.

2. The bicycle of claim 1, wherein at least the upper seat mast is configured to bend in a longitudinal direction in response to riding forces.

3. The bicycle of claim 1, further comprising a pair of seat stays connected to the top tube and extending in a rearward direction beyond the forward frame triangle.

4. The bicycle of claim 1, wherein the upper seat mast is rotably coupled to the forward frame triangle by a pivot assembly at a location that is closer to a bicycle seat than the bottom bracket.

5. The bicycle of claim 1, wherein the pivot assembly comprises at least one of a pair of bearings or a pair of bushings.

6. The bicycle of claim 1, further comprising an adjustment sleeve located between the lower seat mast and the upper seat mast.

7. The bicycle of claim 6, wherein the adjustment sleeve, the lower seat mast, and the upper seat mast are configured such that the adjustment sleeve can slide between the lower seat mast and the upper seat mast.

8. The bicycle of claim 7, further comprising an adjustment locking assembly configured to secure the adjustment sleeve between the lower seat mast and the upper seat mast.

9. The bicycle of claim 6, wherein the adjustment sleeve is made of at least one of a metal, elastomer, and a fiber reinforced plastic.

10. The bicycle of claim 1, wherein the lower seat mast and the upper seat mast are made of a fiber reinforced plastic.

* * * * *